US012032205B2

(12) United States Patent
Mattis et al.

(10) Patent No.: US 12,032,205 B2
(45) Date of Patent: Jul. 9, 2024

(54) CO-MANUFACTURING OF SILICON-ON-INSULATOR WAVEGUIDES AND SILICON NITRIDE WAVEGUIDES FOR HYBRID PHOTONIC INTEGRATED CIRCUITS

(71) Applicant: ORCA Computing Limited, London (GB)

(72) Inventors: Brian Mattis, Austin, TX (US); Taran Huffman, Austin, TX (US); Bryan Woo, Austin, TX (US); Thien-An Nguyen, Austin, TX (US)

(73) Assignee: ORCA Computing Limited, London (GB)

(*) Notice: Subject to any disclaimer, the term of this patent is extended or adjusted under 35 U.S.C. 154(b) by 0 days.

(21) Appl. No.: 18/469,710

(22) Filed: Sep. 19, 2023

(65) Prior Publication Data
US 2024/0004133 A1 Jan. 4, 2024

Related U.S. Application Data

(63) Continuation of application No. 17/177,798, filed on Feb. 17, 2021, now Pat. No. 11,796,737.
(Continued)

(51) Int. Cl.
*G02B 6/136* (2006.01)
*G02B 6/12* (2006.01)

(52) U.S. Cl.
CPC .... *G02B 6/136* (2013.01); *G02B 2006/12061* (2013.01); *G02B 2006/12097* (2013.01);
(Continued)

(58) Field of Classification Search
CPC .......... G02B 6/136; G02B 2006/12061; G02B 2006/12097
See application file for complete search history.

(56) References Cited

U.S. PATENT DOCUMENTS

| 4,608,569 A | 8/1986 | Dickey, Jr. et al. |
| 5,377,289 A | 12/1994 | Johnson |

(Continued)

FOREIGN PATENT DOCUMENTS

| CN | 101379718 | 3/2009 |
| CN | 104484852 | 4/2015 |

(Continued)

OTHER PUBLICATIONS

Chang et al., "Full-duplex spectrum sensing in cognitive radios using optical self-interference cancellation," 2015 9th International Conference on Sensing Technology (ICST), IEEE, pp. 341-344, Dec. 8, 2015.
(Continued)

*Primary Examiner* — Joseph L Williams
(74) *Attorney, Agent, or Firm* — Fenwick & West LLP

(57) ABSTRACT

A method of co-manufacturing silicon waveguides, SiN waveguides, and semiconductor structures in a photonic integrated circuit. A silicon waveguide structure can be formed using a suitable process, after which it is buried in a cladding. The cladding is polished, and a silicon nitride layer is disposed to define a silicon nitride waveguide. The silicon nitride waveguide is buried in a cladding, and annealed. Thereafter, cladding above the silicon waveguide structure can be trenched through, and low-temperature operations can be performed to or with an exposed surface of the silicon waveguide structure.

20 Claims, 15 Drawing Sheets

Related U.S. Application Data

(60) Provisional application No. 63/063,916, filed on Aug. 10, 2020.

(52) U.S. Cl.
CPC .............. *G02B 2006/12169* (2013.01); *G02B 2006/12188* (2013.01); *G02B 2006/12197* (2013.01)

(56) References Cited

U.S. PATENT DOCUMENTS

| | | |
|---|---|---|
| 5,444,864 A | 8/1995 | Smith |
| 5,578,845 A | 11/1996 | Yoshiyuki et al. |
| 5,699,176 A | 12/1997 | Cohen |
| 5,701,371 A | 12/1997 | Ishida |
| RE35,736 E | 2/1998 | Powell |
| 5,757,312 A | 5/1998 | Szmurlo |
| 5,867,293 A | 2/1999 | Kotten |
| 5,904,546 A | 5/1999 | Wood et al. |
| 6,359,714 B1 | 3/2002 | Imajo |
| 6,373,909 B2 | 4/2002 | Lindquist |
| 6,507,728 B1 | 1/2003 | Watanabe |
| 6,539,204 B1 | 3/2003 | Marsh |
| 6,567,648 B1 | 5/2003 | Ahn |
| 6,567,649 B2 | 5/2003 | Souissi |
| 6,745,018 B1 | 6/2004 | Zehavi |
| 6,751,447 B1 | 6/2004 | Jin |
| 6,760,454 B1 | 7/2004 | Shreve |
| 6,771,931 B2 | 8/2004 | Waltho |
| 6,778,319 B2 | 8/2004 | Chavez-Pirson |
| 6,873,639 B2 | 3/2005 | Zhang |
| 6,907,093 B2 | 6/2005 | Blount |
| 6,999,639 B2 | 2/2006 | Tsarev |
| 7,020,396 B2 | 3/2006 | Izadpanah |
| 7,058,368 B2 | 6/2006 | Nicholls |
| 7,064,697 B2 | 6/2006 | Taylor et al. |
| 7,085,497 B2 | 8/2006 | Tiemann |
| 7,116,484 B2 | 10/2006 | Nemoto |
| 7,123,676 B2 | 10/2006 | Gebara |
| 7,130,289 B2 | 10/2006 | Kuan et al. |
| 7,204,647 B2 | 4/2007 | Ohm |
| 7,355,993 B2 | 4/2008 | Adkins |
| 7,366,244 B2 | 4/2008 | Gebara |
| 7,446,601 B2 | 11/2008 | LeChevalier |
| 7,496,257 B2 | 2/2009 | Levner |
| 7,509,054 B2 | 3/2009 | Calabro et al. |
| 7,566,634 B2 | 7/2009 | Beyne et al. |
| 7,650,080 B2 | 1/2010 | Yap |
| 7,660,531 B2 | 2/2010 | Lee |
| 7,672,643 B2 | 3/2010 | Loh |
| 7,680,368 B2 | 3/2010 | Welch et al. |
| 7,711,329 B2 | 5/2010 | Aparin |
| 7,720,029 B2 | 5/2010 | Orava |
| 7,729,431 B2 | 6/2010 | Gebara |
| 7,756,480 B2 | 7/2010 | Loh |
| 7,778,611 B2 | 8/2010 | Asai |
| 7,809,047 B2 | 10/2010 | Kummetz |
| 7,826,808 B2 | 11/2010 | Faulkner |
| 7,853,195 B2 | 12/2010 | Higgins |
| 7,869,527 B2 | 1/2011 | Vetter |
| 7,876,867 B2 | 1/2011 | Filipovic |
| 7,907,895 B2 | 3/2011 | Shinagawa |
| 7,917,177 B2 | 3/2011 | Bauman |
| 8,036,606 B2 | 10/2011 | Kenington |
| 8,055,235 B1 | 11/2011 | Gupta et al. |
| 8,078,130 B2 | 12/2011 | Fudge |
| 8,081,946 B2 | 12/2011 | Fudge |
| 8,098,779 B2 | 1/2012 | Komninakis et al. |
| 8,155,605 B2 | 4/2012 | Hwang |
| 8,170,487 B2 | 5/2012 | Sahota et al. |
| 8,233,872 B2 | 7/2012 | Nagai |
| 8,249,540 B1 | 8/2012 | Gupta |
| 8,270,843 B2 | 9/2012 | Nakamoto |
| 8,299,555 B2 | 10/2012 | Su et al. |
| 8,320,504 B2 | 11/2012 | Peng |
| 8,331,509 B2 | 12/2012 | Wang |
| 8,351,874 B2 | 1/2013 | Dent |
| 8,477,871 B2 | 7/2013 | Neumann |
| 8,521,090 B2 | 8/2013 | Kim |
| 8,526,903 B2 | 9/2013 | Gudem |
| 8,565,681 B2 | 10/2013 | Kim |
| 8,600,200 B1 | 12/2013 | Rakich et al. |
| 8,618,966 B2 | 12/2013 | Kanter |
| 8,682,170 B2 | 3/2014 | Prucnal |
| 8,693,810 B2 | 4/2014 | Suarez et al. |
| 8,730,786 B2 | 5/2014 | Wang |
| 8,781,030 B2 | 7/2014 | Peng |
| 8,785,332 B2 | 7/2014 | Johnson et al. |
| 8,805,298 B2 | 8/2014 | McCallister |
| 8,845,854 B2 | 9/2014 | Lei et al. |
| 8,867,928 B2 | 10/2014 | Piehler |
| 8,872,583 B2 | 10/2014 | Lee |
| 8,971,712 B2 | 3/2015 | Fan et al. |
| 8,977,223 B1 | 3/2015 | Gupta |
| 9,020,307 B2 | 4/2015 | Ishikawa |
| 9,077,440 B2 | 7/2015 | Wyville |
| 9,100,099 B2 | 8/2015 | Loh |
| 9,106,453 B2 | 8/2015 | Wang |
| 9,160,386 B2 | 10/2015 | Rimini |
| 9,178,635 B2 | 11/2015 | Ben-Shlomo |
| 9,184,902 B2 | 11/2015 | Khojastepour |
| 9,195,052 B2 | 11/2015 | Long |
| 9,214,718 B2 | 12/2015 | Mow |
| 9,224,650 B2 | 12/2015 | Lei et al. |
| 9,252,857 B2 | 2/2016 | Negus |
| 9,253,003 B1 | 2/2016 | Harel |
| 9,257,811 B2 | 2/2016 | Gao |
| 9,258,052 B2 | 2/2016 | George |
| 9,268,092 B1 | 2/2016 | Jarecki, Jr. |
| 9,312,895 B1 | 4/2016 | Gupta |
| 9,344,125 B2 | 5/2016 | Kpodzo |
| 9,344,139 B2 | 5/2016 | Sjoland |
| 9,385,268 B2 | 7/2016 | Minamiru et al. |
| 9,391,667 B2 | 7/2016 | Sundstrom |
| 9,438,288 B2 | 9/2016 | Feld |
| 9,450,623 B2 | 9/2016 | Weissman |
| 9,490,963 B2 | 11/2016 | Choi |
| 9,503,134 B2 | 11/2016 | Sadek et al. |
| 9,520,983 B2 | 12/2016 | Choi et al. |
| 9,520,985 B2 | 12/2016 | Choi |
| 9,571,205 B1 | 2/2017 | Suarez |
| 9,589,812 B2 | 3/2017 | Takahashi et al. |
| 9,602,149 B1 | 3/2017 | Tanzi |
| 9,608,718 B2 | 3/2017 | Monsen |
| 9,651,652 B2 | 5/2017 | Kpodzo et al. |
| 9,667,404 B2 | 5/2017 | Sjoland |
| 9,696,492 B1 | 7/2017 | Cox |
| 9,698,913 B2 | 7/2017 | Foster |
| 9,703,046 B2 | 7/2017 | Paquet |
| 9,703,056 B2 | 7/2017 | Neelakantan et al. |
| 9,712,233 B1 | 7/2017 | Deng |
| 9,722,713 B2 | 8/2017 | Tanzi |
| 9,723,612 B2 | 8/2017 | Stapleton |
| 9,726,821 B2 | 8/2017 | Murray et al. |
| 9,735,056 B2 | 8/2017 | Takahashi et al. |
| 9,748,906 B2 | 8/2017 | Stewart |
| 9,768,852 B2 | 9/2017 | Ling |
| 9,774,364 B2 | 9/2017 | Shih |
| 9,775,123 B2 | 9/2017 | Harel |
| 9,793,943 B2 | 10/2017 | Sjoland |
| 9,793,992 B2 | 10/2017 | Hino |
| 9,807,700 B2 | 10/2017 | Harel |
| 9,831,898 B2 | 11/2017 | Pratt |
| 9,847,258 B2 | 12/2017 | Rohleder et al. |
| 9,871,552 B2 | 1/2018 | Din |
| 9,885,806 B2 | 2/2018 | Steinhardt |
| 9,885,825 B2 | 2/2018 | Kopp |
| 9,887,862 B2 | 2/2018 | Zhou et al. |
| 9,900,044 B2 | 2/2018 | Sjoland |
| 9,923,593 B2 | 3/2018 | Andersson |
| 9,923,708 B2 | 3/2018 | Khandani |
| 9,948,377 B1 | 4/2018 | Kim et al. |
| 9,960,805 B2 | 5/2018 | Wyville |

(56) References Cited

U.S. PATENT DOCUMENTS

| | | |
|---|---|---|
| 9,960,850 B2 | 5/2018 | Daniel |
| 9,967,014 B1 | 5/2018 | Park et al. |
| 9,973,282 B2 | 5/2018 | Welch |
| 9,997,363 B2 | 6/2018 | Ono et al. |
| 10,009,120 B2 | 6/2018 | Ranson |
| 10,027,465 B2 | 7/2018 | Sjoland |
| 10,031,246 B2 | 7/2018 | Zhou |
| 10,038,471 B2 | 7/2018 | Chang |
| 10,041,028 B2 | 8/2018 | Sim et al. |
| 10,064,217 B2 | 8/2018 | Rajagopal et al. |
| 10,084,506 B2 | 9/2018 | Sjoland |
| 10,110,306 B2 | 10/2018 | Jain et al. |
| 10,177,836 B2 | 1/2019 | Hong |
| 10,187,158 B2 | 1/2019 | Kikuchi |
| 10,191,217 B2 | 1/2019 | Boutami |
| 10,257,746 B2 | 4/2019 | Jain et al. |
| 10,284,367 B1 | 5/2019 | Le Ngoc |
| 10,321,357 B1 | 6/2019 | Jain et al. |
| 10,325,861 B2 | 6/2019 | Miccoli |
| 10,341,028 B2 | 7/2019 | Kanter |
| 10,356,782 B2 | 7/2019 | Negus |
| 10,367,584 B2 | 7/2019 | Rakich |
| 10,418,775 B2 | 9/2019 | Gao |
| 10,439,287 B2 | 10/2019 | Ashrafi |
| 10,491,313 B2 | 11/2019 | Jain |
| 10,656,350 B2 | 5/2020 | Chen et al. |
| 10,663,663 B2 | 5/2020 | Painchaud |
| 10,673,519 B2 | 6/2020 | Hong |
| 10,727,945 B1 | 7/2020 | Nguyen et al. |
| 10,754,091 B1 | 8/2020 | Nagarajan |
| 10,873,877 B2 | 12/2020 | Jain et al. |
| 11,032,005 B2 | 6/2021 | Vishwanath et al. |
| 11,032,737 B2 | 6/2021 | Jain et al. |
| 11,215,755 B2 | 1/2022 | Liu et al. |
| 11,330,591 B2 | 5/2022 | Raghothaman et al. |
| 11,469,821 B2 | 11/2022 | Jain et al. |
| 2003/0161637 A1 | 8/2003 | Yamamoto |
| 2004/0151238 A1 | 8/2004 | Masenten |
| 2004/0264610 A1 | 12/2004 | Marro |
| 2007/0020884 A1 | 1/2007 | Wang |
| 2011/0065408 A1 | 3/2011 | Kenington |
| 2011/0065409 A1 | 3/2011 | Kenington |
| 2011/0134810 A1 | 6/2011 | Yamamoto et al. |
| 2013/0295980 A1 | 11/2013 | Reuven |
| 2014/0169236 A1 | 6/2014 | Choi |
| 2014/0177660 A1 | 6/2014 | Elmaanaoui |
| 2016/0103341 A1 | 4/2016 | Long |
| 2017/0176780 A1 | 6/2017 | Levy et al. |
| 2018/0006795 A1 | 1/2018 | Raaf |
| 2018/0248627 A1 | 8/2018 | Daniel |
| 2019/0198999 A1 | 6/2019 | Ashrafi |
| 2020/0209476 A1 | 7/2020 | Mattis et al. |
| 2020/0304253 A1 | 9/2020 | Choi et al. |
| 2020/0305159 A1 | 9/2020 | Raghothaman et al. |
| 2021/0036779 A1 | 2/2021 | Nguyen et al. |
| 2021/0088724 A1 | 3/2021 | Liu et al. |
| 2021/0126669 A1 | 4/2021 | Roberts et al. |
| 2021/0153073 A1 | 5/2021 | Hardik et al. |
| 2021/0297156 A1 | 9/2021 | Jain et al. |
| 2021/0336050 A1 | 10/2021 | Mattis et al. |
| 2022/0263529 A1 | 8/2022 | Kokel et al. |

FOREIGN PATENT DOCUMENTS

| | | |
|---|---|---|
| EP | 3561561 | 10/2019 |
| GB | 2139374 | 11/1984 |
| JP | 2002214461 | 7/2002 |
| JP | 2004048200 | 2/2004 |
| JP | 2006301415 | 11/2006 |
| JP | A 2011120120 | 6/2011 |
| JP | A 2013110510 | 6/2013 |
| RU | 2474056 | 1/2013 |
| WO | WO 06/072086 | 7/2006 |
| WO | WO 07/092767 | 8/2007 |
| WO | WO 08/036356 | 3/2008 |
| WO | WO 12/112357 | 8/2012 |
| WO | WO 16/118079 | 7/2016 |

OTHER PUBLICATIONS

IBM, "Silicon Nanophotonic Packaging," https://researcher.watson.ibm.com/researcher/view_group_subpage.php?id=5522, Jul. 2016.

Li et al., "Multimode silicon photonics," Nanophotonics, vol. 8, No. 2, pp. 227-247, May 16, 2019.

Mothe et al., "Multichannel Microwave Photonics Signals Summation Device," IEEE *Photonics Technology Letters*, vol. 3, No. 3, pp. 140-142, Feb. 1, 2011.

Velha et al., "Simultaneous data transmissions on engineered closely packed silicon-on-insulator waveguide arrays," 19th International Conference on Transparent Optical Networks (ICTON), IEEE, pp. 1-4, Jul. 2, 2017.

Tang et al., "System limitations due to channel cross-coupling in a highly parallel polymer-based single-mode channel waveguide array," Advances in Resistive Technology and Processing XVI, vol. 2042, 12 pages, Aug. 16, 1993.

Tartaret-Josniére et al., "Microwave Photonics Summation Device with up to 19 Input Signals in K and Ku Bands," *Journal of Lightwave Technology*, vol. 34, No. 20, pp. 4715-4721, Oct. 15, 2016.

Yoo et al., "Heterogeneous 2D/3D photonic integrated microsystems," *Microsystems & Nanoengineering*, 2, 16030, Aug. 2016.

Kwak, MyoungJun, "The Impact of Loop Filter in Phase Locked Loop," Bachelor's Thesis Metropolia University of Applied Sciences, Feb. 19, 2019, 50 pages.

Lecture 150—Phase Noise—1 (Jun. 20, 2003), P.E. Allen 2003, 2 pages.

Mokhtari-Koushyar et al., "Nonlinear Distortions Induced by Coherent Combinations in Microwave Photonic Links," 2019 IEEE, Global Communications Conference, Dec. 9-13, 2019, 6 pages.

Mokhtari-Koushyar et al., "Laser Diode Chirp Requirements in Wideband Analog Photonic Signal Processing," 2020 IEEE, Optical fiber Communications Conference and Exhibition, Mar. 8-12, 2020, 3 pages.

Skyworks AN279, "Estimating Period Jitter from Phase Noise," Skyworks Solutions, Inc., Sep. 21, 2021, 8 pages.

Amiri, I.S. et al., "W-Band OFDM Transmission for Radio-Over-Fiber Link Using Solitonic Millimeter Wave Generated by MRR" (Aug. 2014) IEEE Journal of Quantum Electronics 50(8): 622-628.

Amiri, I.S. et al., "2×2 MIMO-OFDM-RoF generation and transmission of double V-Band signals using a microring resonator system" (Dec. 12, 2015) Optical and Quantum Electronics, Springer US, NY vol. 48:1 1-15.

Blumenthal, D.J., "Photonic integration for UV to IR applications" (2020) APL Photonics 5: 020903 (12 pages).

Huffman, T.A. et al., "Integrated Resonators in an Ultralow Loss Si3N4/SiO2 Platform for Multifunction Applications" (Jul./Aug. 2018) IEEE Journal of Selected Topics in Quantum Electronics vol. 24, No. 4 (9 pages).

Quan et al., "A Novel Phase Noise Mitigation Method for Full-Duplex Transceivers" 2019 11th International Conference on Wireless Communications and Signal Processing (WCSP) IEEE Oct. 23, 2019 pp. 1-6.

Syrjälä et al., "Analysis of Oscillator Phase-Noise Effects on Self-Interference Cancellation in Full-Duplex OFDM Radio Transceivers" IEEE Transactions on Wireless Communications vol. 13, No. 6, pp. 2977-2990 Jun. 6, 2014.

Sahai et al., "Understanding the Impact of Phase Noise on Active Cancellation in Wireless Full-Duplex" Asilomar Conference on Signals, Systems and Computers Conference Record, IEEE Computer Society pp. 29-33 Nov. 12, 2012.

Zhu, D. et al., "Integrated photonics on thin-film lithium niobate" (Feb. 23, 2021) arxiv.org, Cornell University Library, 201 Olin Library Cornell University Ithaca, NY 14853 (94 pages).

US 12,032,205 B2

CO-MANUFACTURING OF SILICON-ON-INSULATOR WAVEGUIDES AND SILICON NITRIDE WAVEGUIDES FOR HYBRID PHOTONIC INTEGRATED CIRCUITS

CROSS-REFERENCE TO RELATED APPLICATIONS

This application is a continuation of, and claims priority under 35 U.S.C. § 120 to, U.S. patent application Ser. No. 17/177,798, filed Feb. 17, 2021, and titled "Co-Manufacturing of Silicon-on-Insulator Waveguides and Silicon Nitride Waveguides for Hybrid Photonic Integrated Circuits," which claims the benefit of U.S. Provisional Patent Application No. 63/063,916, filed Aug. 10, 2020, and titled "Novel Hybrid Photonic Platform Integration Scheme," the contents of each of which are incorporated herein by reference as if fully enclosed herein.

TECHNICAL FIELD

Embodiments described herein relate to manufacturing of optical waveguides and, in particular, to co-manufacturing of silicon-on-insulator ("SOP") waveguides and silicon nitride ("SiN") waveguides in hybrid photonic integrated circuits, optical systems, and switching networks.

BACKGROUND

A photonic integrated circuit may be selected to replace a semiconductor integrated circuit to reduce power consumption and improve performance. A photonic integrated circuit includes a number of optical waveguides configured to direct light to, and between, one or more passive or active optical circuits, photonic circuits, delay loops, input/output facets, and so on. An optical waveguide can be formed from a number of materials, including crystalline silicon ("Si" or "SOI" waveguides) and silicon nitride ("SiN" waveguides), each of which has advantages and disadvantages in both performance and manufacturability.

Some conventional systems, typically referred to as "hybrid photonic systems," incorporate both SOI waveguides and SiN waveguides to leverage advantageous properties of each. However, conventional processes used to manufacture SOI waveguides, semiconductor switching structures, and SiN waveguides are typically thermally incompatible. As a result, conventional hybrid photonic systems are formed utilizing low-temperature methods, such as plasma enhanced chemical vapor deposition, to form SiN waveguides, resulting in low-performance SiN waveguides.

SUMMARY

Embodiments described herein take the form of a method of manufacturing a hybrid photonic system. An example method includes the operations of: receiving a starting substrate with a layer of silicon formed on an insulating layer; forming a silicon structure from the layer of silicon, the silicon structure defining a silicon waveguide and a top surface; burying the silicon structure in a first oxide layer; forming a silicon nitride (which may be abbreviated "SiN" herein) layer on the first oxide layer; defining a SiN waveguide from the SiN layer; burying the SiN waveguide in a second oxide layer; optionally annealing at least a portion of the second oxide layer; trenching (and/or otherwise etching) through at least the first oxide layer and/or other dielectric layers to expose the top surface of the silicon structure; implanting the top (silicon) surface with an implant, activating the implant; disposing a third oxide layer over at least the top surface; defining a via through the third oxide layer; and conductively coupling through the via to the top surface of the silicon structure.

Some embodiments described herein take the form of a method of manufacturing a hybrid photonic system including the operations of: defining a silicon structure on an oxide layer (which may be thermal oxide or deposited oxide), the silicon structure defining a first silicon waveguide and a second silicon waveguide; burying the silicon structure in a first oxide layer; annealing the first oxide layer; forming a SiN layer on the first oxide layer, the SiN layer defining an etch stop layer above the first silicon waveguide and a SiN waveguide above the second silicon waveguide; burying the SiN layer in a second oxide layer; annealing the second oxide layer (and/or other oxide portions of the stack); disposing a lithographic mask over the second silicon waveguide and the SiN waveguide; selectively etching/trenching the annealed oxide layer(s) to expose the etch stop layer; removing the etch stop layer, trenching through a portion of the (annealed) first oxide layer below the etch stop layer to expose a top surface of the silicon structure (which may be adjacent to the first silicon waveguide); and performing a temperature-sensitive operation (or more than one operation) with the top surface of the silicon structure.

Some embodiments described herein take the form of a method of manufacturing a hybrid photonic system including the operations of: forming a silicon structure defining a silicon waveguide; disposing a first oxide layer around the silicon waveguide; annealing the first oxide layer to define a first cladding; polishing the first cladding to define a planar surface; forming a SiN waveguide on the planar surface above the silicon waveguide, separated from the silicon waveguide by a thickness of the first cladding; disposing a second oxide layer around the SiN waveguide and the silicon waveguide; annealing the second oxide layer to define a second cladding; trenching through a portion of the first cladding and the second cladding to expose a top surface of the silicon structure adjacent to the silicon waveguide; and defining a semiconductor circuit into the top surface.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
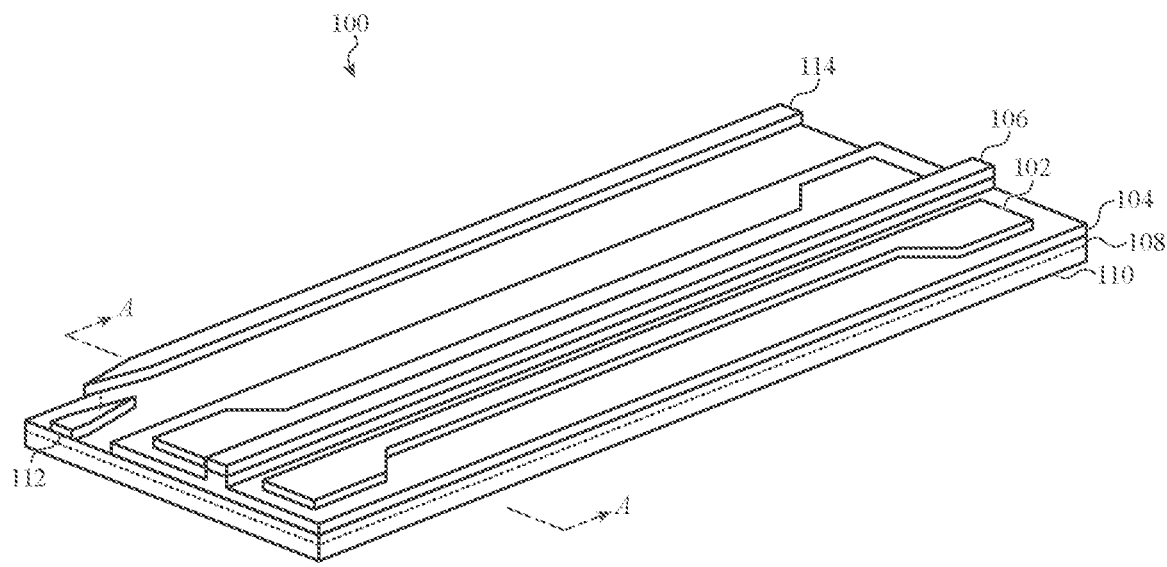
FIG. 1 depicts an example photonic element that may be a portion of a photonic integrated circuit, the photonic element manufactured, at least in part, by methods and techniques described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to manufacturing of photonic elements and, in particular, to systems and methods for co-manufacturing silicon nitride ("SiN") waveguides and crystalline silicon waveguides for hybrid photonic systems (e.g., systems and/or circuits including both SiN waveguides and silicon waveguides) in a single manufacturing process. The method(s) of fabrication described herein result in nanoscale or microscale optical and/or electrical structures that exhibit dramatically improved optical and electrical performance over conventionally-produced hybrid photonic systems.

More specifically, embodiments described herein can be leveraged to produce hybrid photonic systems and circuits, and associated semiconductor electronics, that include (1) silicon waveguides having annealed claddings and (2) annealed SiN waveguides (and claddings), without risking damage to any semiconductor electronics or temperature-sensitive components (e.g., metallizations, implants, semiconductor switches and traces, and so on) that would otherwise be damaged or vaporized by the high temperatures required to anneal claddings and/or SiN depositions. As such, a hybrid photonic system produced according to methods described herein can leverage substantially improved optical performance (e.g., low propagation loss) from annealed SiN waveguides (and claddings) for overall improved device performance.

More specifically, embodiments described herein manufacture a hybrid photonic system or, more particularly, photonic elements thereof, in a three-phase process. A first phase of the manufacturing process comprises defining one or more silicon structures that are configured to operate as silicon waveguides and/or are configured to provide a substrate for further complementary metal oxide semiconductor ("CMOS") manufacturing operations, such as those that may be employed to define one or more semiconductor switches. A second phase of the manufacturing process buries the result of the first phase below a cladding that may be annealed at high temperature (because the silicon structure has not yet been processed to include any temperature-sensitive processes, structures, or regions). The second phase also defines one or more SiN waveguide layers which also may be annealed and/or buried within an annealed cladding. The third phase of the manufacturing process trenches into the result of the second phase in order to expose a surface of the silicon structure formed in the first phase. Through this trench, one or more CMOS or other low-temperature or temperature-sensitive operations can be performed. Thereafter, the exposed region can be passivated by disposing an oxide layer thereupon and, in many cases, defining one or more vias through the oxide layer so as to conductively couple to one or more portions of an electrical circuit defined during the third phase. As a result of this manufacturing technique, both high-temperature processing operations (that improve optical performance) and low-temperature processing operations (that define optoelectronic or thermo-optic circuits) can be performed to the same substrate.

In addition, as may be appreciated, because many processes described herein are non-bonding processes, relative alignment between different waveguides (and, in particular, transitions between waveguides of different materials) can be well-controlled. As a result, losses at transitions between waveguides are also reduced compared against hybrid photonic circuits produced or manufactured via bonding processes.

These foregoing and other embodiments are discussed below with reference to FIGS. 1-7. However, those skilled in the art will readily appreciate that the detailed description given herein with respect to these figures is for explanation only and should not be construed as limiting.

In particular, FIG. 1 depicts an example photonic element that may be a portion of a photonic integrated circuit, the photonic element manufactured, at least in part, by methods and techniques described herein. FIG. 1 depicts a simplified representation of the photonic element, omitting certain structural or functional layers (e.g., claddings) for simplicity of illustration.

The example photonic element 100 includes multiple waveguides and a thermo-optic heating element. It may be appreciated, however, that this is merely one simplified example of a component of a photonic integrated circuit, such as described herein. Any suitable photonic, electrical, or thermo-optical structure can be formed by leveraging the method described herein.

The photonic element 100 includes two heating elements, one of which is identified as the electrically conductive heater 102. The electrically conductive heater 102 (which may be defined at least in part by a discrete layer of material (or combinations of materials), such as shown, and/or may be defined at least in part) is a member of a pair of electrically conductive heaters that flank a silicon optical waveguide 104. The silicon optical waveguide 104 is implemented as a rib waveguide, but this is not required of all embodiments. In other examples, other waveguide types and constructions may be used.

The silicon optical waveguide 104 is disposed below a cladding 106 that may be formed from a silicon oxide, such as silicon dioxide. The cladding 106 and the silicon optical waveguide 104 cooperate to transit light (e.g., infrared light) through the silicon optical waveguide 104. The photonic element 100 and, in particular, the silicon optical waveguide 104, is disposed on an oxide region 108 of a bulk silicon wafer 110. The oxide region 108 may be thermal oxide and/or deposited oxide. The oxide region 108 may be annealed and/or may extend over one or more layers of the photonic element 100 so as to encapsulate and/or bury those layers. For simplicity of illustration, the layers of the photonic element 100 are shown without such cladding, encapsulation, passivation or potting, but it may be appreciated that, in certain embodiments, the oxide region 108 may encompass a larger volume than illustrated.

As a result of this construction, when an electrical current is applied through the pair of electrically conductive heaters, the index of refraction of the silicon optical waveguide 104 will change, resulting in a phase shift in light passing through the silicon optical waveguide 104. In this manner, current control of the pair of electrically conductive heaters results in fine control over a phase of light passing through the silicon optical waveguide 104.

In some constructions, the silicon optical waveguide 104 can be a branch of a Mach-Zehnder interferometer ("MZI"). More particularly, light passing through a waveguide can be divided along two paths, one of which transits the silicon optical waveguide 104. Thereafter, the light may be combined. Any phase difference between the two branches manifests as interference, either constructive (in-phase) or destructive (out-of-phase). In this manner, by electrically controlling current through the silicon optical waveguide 104 (and thus controlling heat generated by the pair of electrically conductive heaters), a variable photonic switch is created.

It may be readily appreciated by a person of skill in the art that such a switch may be a portion of a logical gate or some other higher-order photonic or electrical circuit.

In many cases, an MZI switch, such as described herein, can be formed with and/or can be optically coupled to one or more other optical waveguides that, in turn, are portions of other optical switches or photonic circuits. For example, an MZI switch may be optically coupled to one or more delay lines.

As known to a person of skill in the art, silicon waveguides and silicon nitride waveguides exhibit different properties and may be desirable in different circumstances. For example, a SiN waveguide may be selected for power handling reasons, low-loss reasons, larger transparency windows (e.g., ability to guide visible and infrared light), input/output coupling, and so on. A silicon waveguide may be selected for its high refractive index, narrow transparency window, or for other properties such as electrical or thermal properties. Accordingly, generally and broadly, it may be appreciated that a photonic circuit such as described herein may be desirably designed with both silicon waveguides and SiN waveguides.

To illustrate this possibility, the embodiment shown in FIG. 1, includes another silicon waveguide, identified as the silicon waveguide 112, formed onto the oxide region 108 of a bulk silicon wafer 110. The silicon waveguide 112 is tapered to a point to define a transition (which may occur at least in part through a cladding or other oxide layer, not shown) to a SiN waveguide 114, which is also tapered. Either or both tapers of the silicon waveguide 112 or the SiN waveguide 114 may be linear or nonlinear. In many examples, the tapers are nonlinear, and overlap in space, separated by an interlayer gap.

As may be appreciated, a transition such as shown is highly sensitive to misalignment and, as noted above, forming the (annealed) SiN waveguide 114 using conventional methods may result in damage to other portions or components of the photonic element 100, such as one or both of the pair of electrically conductive heaters. To account for these and other problems exhibited by conventional manufacturing methods, a method of manufacturing a photonic structure including annealed SiN waveguides, silicon structures, and silicon waveguides, such as shown in FIG. 1 is provided below.

More broadly, it may be appreciated that these foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that a thermo-optical heater is merely one example photonic circuit element that may be manufactured according to methods described herein. Other example circuits that can be manufactured according to methods described herein include transitions, input facets/input couplings, output facets/output couplings, delay lines, and so on. This foregoing list is not exhaustive; more generally, it is appreciated that the methods described herein provide a framework for leveraging beneficial optical properties of both SiN and silicon waveguides. Thus, any photonic circuit, element, or waveguide that includes silicon portions and SiN portions can be manufactured by suitably modifying methods as described herein.

For simplicity of description and illustration, FIGS. 2A-4K are provided. These figures depict cross sections of an example photonic circuit that includes both SiN waveguides and silicon waveguides, along with temperature-sensitive semiconductor structures.

A person of skill in the art will readily appreciate that implementations of the methods described herein may be used to manufacture any photonic circuit, electro-photonic circuit, thermo-optic circuit, or any combinations thereof, of any suitable complexity leveraging any suitably sized die.

More broadly, the simplified examples provided herein are merely presented to illustrate manufacturing techniques that, in turn, can be applied to manufacture portions or entireties of active or passive electronics and/or photonics integrated circuits of any suitable complexity. The following cross sections are merely examples, and should not be construed as limiting the methods disclosed herein to only the precise forms described in reference to the following described figures.

FIGS. 2A-2I depict sequential cross sections corresponding to intermediate steps of manufacturing an example simplified photonic integrated circuit that includes a thermo-optic heater and at least one SiN waveguide and at least one crystalline silicon waveguide, following at least a portion of a method of manufacturing a silicon waveguide structure, as described herein.

More generally, these figures depict progressive cross sections corresponding to intermediate stages of manufacture of silicon portions of an example optoelectric structure. The cross-section may be taken through line A-A of FIG. 1, but this is merely one example.

Figure 2A:
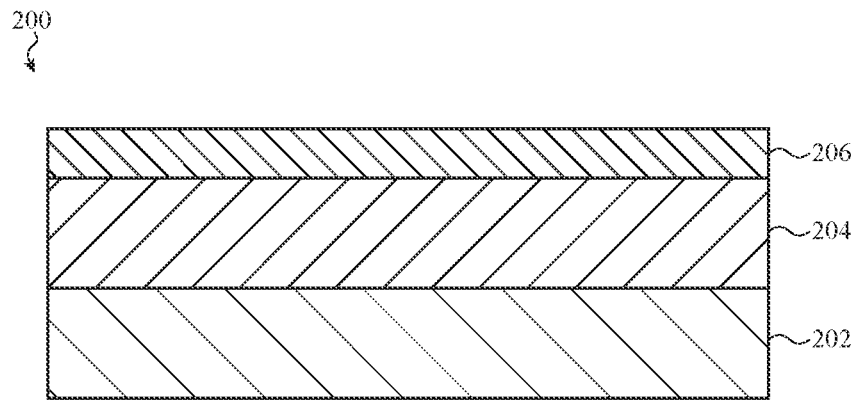
FIGS. 2A-2I depict sequential cross sections corresponding to intermediate steps of manufacturing an example simplified photonic integrated circuit that includes a thermo-optic heater and at least one SiN waveguide layer and at least one crystalline silicon waveguide layer, following at least a portion of a method of manufacturing a silicon waveguide structure, as described herein.

In particular, FIG. 2A depicts a cross section 200 of an intermediate stage of manufacturing of an optoelectric structure. The optoelectric structure can be formed at any suitable scale and a person of skill in the art may appreciate that relative size, dimensions, and/or layout of features varies from embodiment to embodiment and implementation to implementation.

More specifically, FIG. 2A depicts a starting substrate. The starting substrate depicted in the cross section 200 includes three layers of chemically of structurally discrete materials, although it may be appreciated that boundaries between the depicted layers may transition over a distance that varies from embodiment to embodiment.

The cross section 200 depicts a bulk silicon layer 202 that may be any suitable thickness. Formed onto and/or into the bulk silicon layer 202 is an oxide layer 204, which may comprise silicon dioxide ($SiO_2$) The oxide layer 204 can be formed by any suitable process or technique, whether active or passive. The oxide layer 204 may be a thermal oxide and/or a deposited oxide. In other cases, certain regions of the oxide layer 204 may be thermal oxide whereas other regions may be deposited. In some cases, a multi-layer process may be used to form the oxide layer 204. For example, a thermal oxide may be formed into the bulk silicon layer 202 after which one or more deposited oxide layers may be disposed, grown, or otherwise formed.

One example process or technique by which the oxide layer 204 may be formed includes placing the bulk silicon layer 202 in a furnace to form a thermal oxide layer. The furnace may be a vertical furnace or a horizontal furnace; any suitable furnace or orientation may be used. The oxide layer 204 can be formed in a layer of uniform thickness or, in some cases, the oxide layer 204 may be formed to a particular desired profile.

The oxide layer 204 is shown as extending across an entire width of the bulk silicon layer 202, but it may be appreciated that this is not required of all embodiments. For example, in some embodiments, the oxide layer 204 is formed in a pattern over the bulk silicon layer 202 (and/or into the bulk silicon layer 202), for example by leveraging a local oxidation technique. As with other layers of material described herein, the oxide layer 204 can be formed to any suitable thickness. One example thickness is on the order of 2-10 micrometers. In other cases, a thinner or a thicker layer of the oxide layer 204 may be formed. In many cases, a thickness of the oxide layer 204 is determined based on an optical property of the oxide layer 204 at the selected thickness. In other words, a thickness of the oxide layer 204 may be determined so that the oxide layer 204 can provide mechanical support and/or optical functionality to other layers of the optoelectric structure.

Disposed over the oxide layer 204 is a silicon layer 206. The silicon layer 206 can be amorphous or crystalline and may be formed using any suitable process or technique, which may be known to a person of skill in the art. Example processes can include seed methods, chemical vapor deposition, sputtering, wafer bonding, and so on.

In other cases, the silicon layer 206 and the oxide layer 204 can be formed in the same or similar processes. For example, the bulk silicon layer 202 can be subjected to an oxygen implantation technique and thereafter annealed or otherwise exposed to high temperature. In this process, the oxide layer 204 may separate the bulk silicon layer 202 from the silicon layer 206 to define the three-layer stack-up shown in FIG. 2A.

As with other layers, depositions, formations, or features described herein, the silicon layer 206 is shown as extending across an entire width of the bulk silicon layer 202 and the oxide layer 204, but it may be appreciated that this is not required of all embodiments. For example, in some embodiments, the silicon layer 206 is formed in a pattern over the oxide layer 204 (and/or into the oxide layer 204 or the bulk silicon layer 202). As with other layers of material described herein, the silicon layer 206 can be formed to any suitable thickness. One example thickness is on the order of 200-500 nanometers. In other cases, a thinner or a thicker layer of the silicon layer 206 may be formed. In many cases, a thickness of the silicon layer 206 is determined based on an optical or electrical property of the silicon layer 206 at the selected thickness. In other words, a thickness of the silicon layer 206 may be determined so that the silicon layer 206 can provide preferred or ideal optical or electrical performance properties of the optoelectronic device or any electrical components (such as, but not limited to, CMOS, Bipolar transistors, and so on).

In some cases, although not necessarily required of all embodiments, the silicon layer 206 may be doped to introduce or reduce charge carriers in the silicon layer 206. More simply, the silicon layer 206 with a suitable dopant may be either an n-type semiconductor or a p-type semiconductor. For simplicity of description, the embodiments that follow contemplate the silicon layer 206 as a p-type semiconductor, but it may be appreciated that this is not required of all embodiments and other implementations may prefer different dopants, dopant concentrations, and so on.

The foregoing examples are not exhaustive of all manufacturing methods that may be employed to obtain a silicon layer, such as the silicon layer 206, disposed over an insulator, such as the oxide layer 204. This structure, as may be known to a person of skill in the art, may be referred to as a "Silicon on Insulator" or "SOT" structure. Accordingly, more generally and broadly, FIG. 2A depicts a starting substrate as an SOI substrate. In some examples, an off-the-shelf SOI substrate may be used.

Figure 2B:
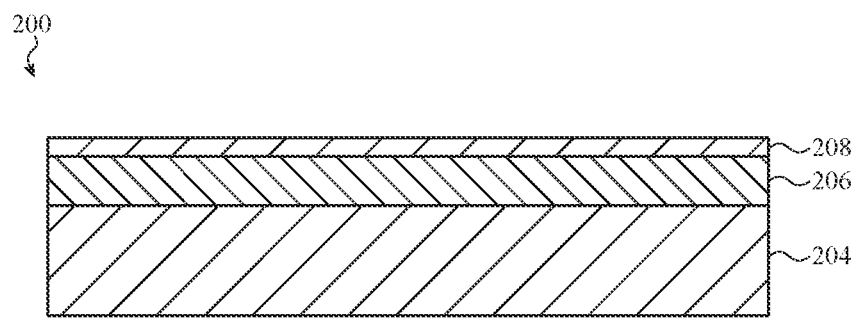

FIG. 2B depicts the starting substrate of FIG. 2A omitting the bulk silicon layer 202. In some cases, the bulk silicon layer 202 may be removed using a suitable mechanical, chemical, electrical, or photonic (e.g., laser ablation) process, although this may not be required of all embodiments. Alternatively, the bulk silicon layer 202 could be replaced or supplemented with a quartz or other silicon-oxide based substrate or other material layer. In some cases, the bulk silicon layer 202 depicted in FIG. 2A may remain; omission of the bulk silicon layer 202 from FIGS. 2B-2I does not imply or suggest that removal of the bulk silicon layer 202 is required of all embodiments.

In view of the foregoing, FIG. 2B depicts the starting substrate of FIG. 2A including an oxide layer 208. As with other embodiments described herein, the starting substrate depicted in the cross section 200 of FIG. 2B includes multiple layers of chemically or structurally discrete materials, although it may be appreciated that boundaries between the depicted layers may transition over a distance that varies from embodiment to embodiment.

The oxide layer 208 is an insulating layer, also referred to as a dielectric layer. In many examples, the oxide layer 208 is formed as an oxide layer (e.g., $SiO_2$) over the silicon layer 206 that, in turn, is formed over the oxide layer 204. In some cases, the oxide layer 208 is formed into the silicon layer 206, whereas in other layers, the oxide layer 208 is disposed onto the silicon layer 206.

The oxide layer 208 can be formed by a thermal growth process, chemical vapor deposition, or by any suitable process or technique.

As with other layers, depositions, formations, or features described herein, the oxide layer 208 is shown as extending across an entire width of the bulk silicon layer 202 (not shown, see FIG. 2A), the oxide layer 204, and the silicon layer 206, but it may be appreciated that this is not required of all embodiments. For example, in some embodiments, the oxide layer 208 is formed in a pattern over the silicon layer 206 (and/or into the silicon layer 206 or the oxide layer 204). In some cases, the oxide layer 208 may form from the oxide layer 204.

As with other layers of material described herein, the oxide layer 208 can be formed to any suitable thickness. One example thickness is on the order of 100-500 nanometers. In other cases, a thinner or a thicker layer of the oxide layer 208 may be formed. In many cases, a thickness of the oxide layer 208 is determined based on a mechanical or dielectric property of the oxide layer 208 at the selected thickness. In other words, a thickness of the oxide layer 208 may be determined so that the oxide layer 208 can provide mechanical, manufacturing, or electrical/dielectric support to other layers of the example optoelectric structure, whether such support is required for use in field or whether such support is required for subsequent manufacturing processes.

Figure 2C:
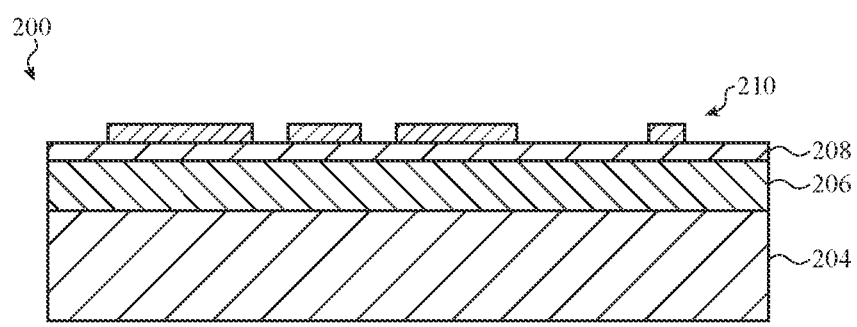

FIG. 2C depicts the substrate of FIG. 2B, including a lithographic mask 210, that is configured to define one or more features resulting from a subsequent subtractive manufacturing step (e.g., chemical etching, mechanical ablation, laser ablation, and so on). The lithographic mask 210 can be formed from, and/or may include, any suitable number of materials including resins, polystyrenes, lacquers, and so on including one or more photoactive additives or compounds.

In many cases, after the lithographic mask 210 is disposed on the surface of the oxide layer 208, it may be developed or otherwise cured by exposing the lithographic mask 210 and/or the entire stack-up to a curing condition dependent upon one or more properties of the lithographic mask 210 itself.

After, and/or as a portion of curing, the lithographic mask 210 may be exposed to light such as ultraviolet light, or a focused beam of electrons, after which a particular pattern may be defined onto the oxide layer 208. In some cases, subsequent cleaning of the lithographic mask 210 may be required or preferred, in particular to remove any unnecessary portions of the lithographic mask 210.

In the illustrated embodiment, the lithographic mask 210 is a positive photoresist, but this may not be required of all embodiments. In other cases and other configurations, negative photoresist patterns may be used.

The lithographic mask 210 may be configured for use with a lithographic process, such as photolithography (configured to operate in either ultraviolet or visible light or any suitable band of light). In such examples, the lithographic mask 210 may be a photoresist layer disposed using a suitable technique.

The lithographic mask 210 can be formed by any suitable process. As with other layers, depositions, formations, or features described herein, the lithographic mask 210 is shown as extending in a particular defined pattern across a majority of a width of the stack-up, but it may be appreciated that this is not required of all embodiments. In some cases, the lithographic mask 210 may define a localized pattern.

In addition, as with other layers of material described herein, the lithographic mask 210 can be formed to any suitable thickness, which may vary from process to process. One example thickness is on the order of 100-500 nanometers. In other cases, a thinner or a thicker layer of the lithographic mask 210 may be formed.

Figure 2D:
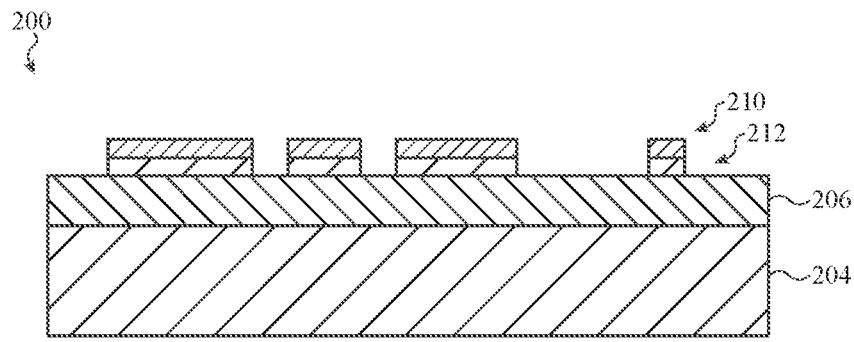

FIG. 2D depicts the substrate of FIG. 2C, after etching through apertures defined by the lithographic mask 210. The etching operation, a result of which is shown in FIG. 2D, may have any suitable selectivity and any suitable isotropy/anisotropy. The etch may be a wet etch process or a plasma-phase process, and selection therebetween (or of another process or process type) may be based at least in part on design or manufacturing constraints.

For simplicity of description and illustration, the result of the etch process shown in FIG. 2D depicts a highly selective, anisotropic etch. In more simple terms, the etch of FIG. 2D proceeds linearly downward through the pattern defined by the lithographic mask 210 (e.g., negative space in which no mask material is present), and does not isotopically intrude below portions of the lithographic mask 210 to a significant extent. Further, the process is selective in that only the material of the oxide layer 208 is etched. It may be appreciated, however, that this is merely one (idealized and simplified) example and in many cases, and/or in real implementations, different results may be achieved.

More broadly, in view of the foregoing, any suitable etching process suitable for use with the lithographic mask 210 may be used. In some cases, a hydrofluoric etch may be performed. In other cases, a buffered etch (e.g., "BOE" or "buffered oxide etch") process may be performed. In yet other cases, laser etching, ablation, or mechanical etching may be suitable. A person of skill in the art may readily appreciate that suitable etching processes may differ from implementation to implementation and embodiment to embodiment.

The etch process may be terminated and/or stopped once a desired depth is achieved. As noted above, the termination of the etch may be defined, at least in part, by a selectivity of the etchant or etching process.

In other cases, the etch process may be stopped once that process has etched through an entirety or majority of the oxide layer 208 (e.g., to a particular depth). In other cases, the etch process may be selective in that it is reactive only with the material of the oxide layer 208.

Regardless of the process (or process characteristics, such as etchant, duration, temperature, pressure, and so on) selected to leverage the pattern defined by the lithographic mask 210 to etch through the oxide layer 208, once the etch is completed, a hardmask layer 212 may be defined. More specifically, once the oxide layer 208 is patterned according to the lithographic mask 210, it may be referred to as the hardmask layer 212.

Figure 2E:
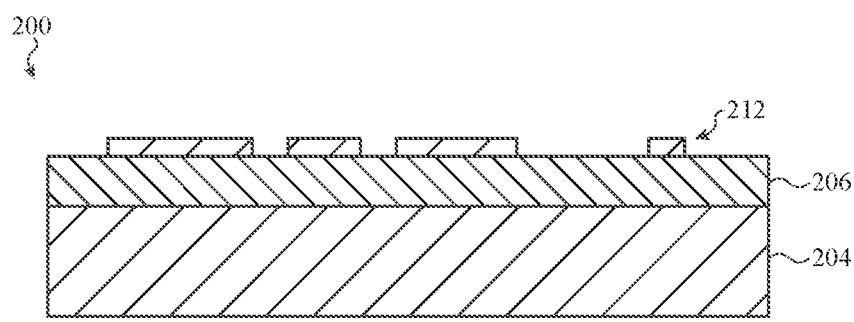

Thereafter, as shown in FIG. 2E, remaining portions of the lithographic mask 210 may be removed, leaving behind the oxide layer 204, the silicon layer 206, and the hardmask layer 212. The lithographic mask 210 can be removed using any suitable process, including stripping processes, cleaning processes, and so on. For example, the stack-up may be placed in a solvent bath, the solvent configured to interact with the material of the lithographic mask 210. In other cases, plasma photoresist stripping may be used. More generally, any suitable process, which may be specific to a material or bonding type of the lithographic mask 210, may be used to remove residual portions of the lithographic mask 210.

Figure 2F:
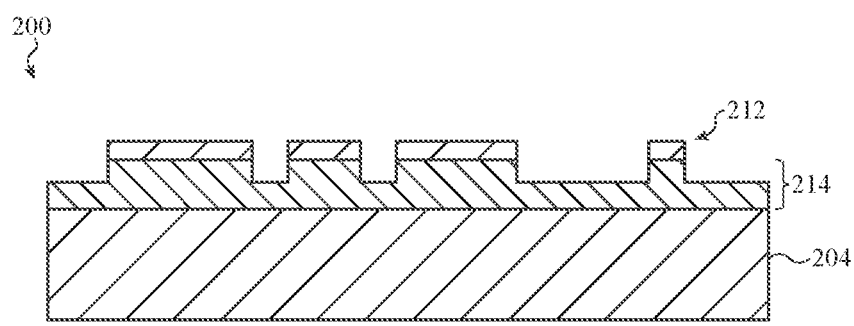

As shown in FIG. 2F, another etching process can be performed after removing the lithographic mask 210. This second etching process leverages the pattern defined by the hardmask layer 212 to define one or more features into the silicon layer 206. More specifically, the hardmask layer 212 defines (in the example embodiment) at least one optical waveguide and at least one elevated landing region, described in greater detail below with reference to subsequent drawings and manufacturing operations. The dimensions, profile, and properties of the optical waveguide and the elevated landing regions can vary from embodiment to embodiment. For example, in some embodiments, elevated landing regions can be excluded altogether, which may enable heating element definition to be in closer proximity to the optical waveguide. In such a case, the heating elements may be defined only in the lower regions of patterned silicon layer 214.

In some embodiments, removal of the lithographic mask 210 as shown in FIG. 2E may be optional and/or may be performed after the second etch, a result of which is shown in FIG. 2F.

As with other etching processes described and referenced herein, the second etching operation, a result of which is shown in FIG. 2F, may have any suitable selectivity and any suitable isotropy/anisotropy. The etch may be a wet etch process or a plasma-phase process, and selection therebetween (or of another process or process type) may be based at least in part on design or manufacturing constraints.

For simplicity of description and illustration, the result of the etch process shown in FIG. 2F depicts an anisotropic etch with well-defined stop conditions. The etch can be performed relative to any suitable crystalline surface of the silicon layer 206. In other words, the silicon layer 206 may be formed or oriented, in some examples, to facilitate highly anisotropic etching such as shown in FIG. 2F.

In more simple terms, the etch of FIG. 2F proceeds linearly downward through the apertures and/or pattern defined by the hardmask layer 212, and does not isotopically intrude below portions of the silicon layer 206 to a significant extent. It may be appreciated, however, that this is merely one (idealized and simplified) example and, in many cases, and/or in real implementations, different results may be achieved. In many cases, a duration of the etching process may be selected at least in part based on dimensions and/or size of the features being formed into the silicon layer 206.

More broadly in view of the foregoing, any suitable etching process suitable for use with the pattern defined by the hardmask layer 212 may be used. A person of skill in the art may readily appreciate that suitable etching processes may differ from implementation to implementation and embodiment to embodiment. The etch process may be terminated and/or stopped once a desired depth is achieved. As noted above, the termination of the etch may be defined, at least in part, by a selectivity of the etchant or etching process and/or a duration, pressure, temperature, or other property of the etching process.

Regardless of the process (or process characteristics, such as etchant, duration, temperature, pressure, and so on) selected to leverage the pattern defined by the hardmask layer 212 to etch through the silicon layer 206, once the etch is completed, a patterned silicon layer 214 may be defined. More specifically, once the silicon layer 206 is patterned according to the hardmask layer 212, it may be referred to as the patterned silicon layer 214.

As noted above, features of the patterned silicon layer 214 may vary from embodiment to embodiment and photonic/electrical design to design. More specifically, it may be appreciated that the features shown and/or defined into the patterned silicon layer 214 as shown in these figures is not required of all embodiments. In other cases, more or fewer features of varying dimensions may be formed.

In this example, two primary features are formed into the patterned silicon layer 214, both of which are discussed in greater detail below with reference to subsequent manufacturing steps. Broadly, a set of features is defined as a set of three features on a left side of the patterned silicon layer 214 (with reference to the orientation of the patterned silicon layer 214 as shown in FIG. 2F), and an offset feature is defined on a right side of the patterned silicon layer 214. In other cases, other features may be formed by the etching process referenced above.

Figure 2G:
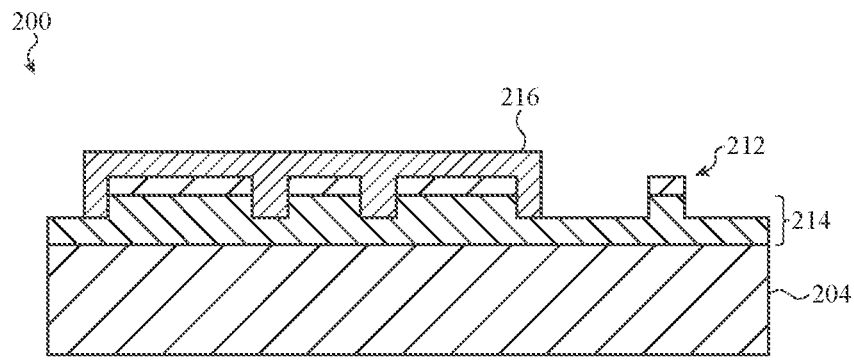

Next, as shown in FIG. 2G, a lithographic mask 216 can be disposed over a subset of the features defined onto/into the patterned silicon layer 214. In the illustrated example, the lithographic mask 216 is disposed over three features of the patterned silicon layer 214, but this is not required of all embodiments. As with other examples described herein, the lithographic mask 216 can be formed or disposed using any suitable process, may be disposed to any suitable thickness, and so on. Materials and properties thereof may vary from embodiment to embodiment. In some embodiments where ridge waveguides may or may not be required, a lithographic mask such as shown in FIG. 2G can be omitted entirely, and etching steps as described in reference to FIG. 2F and FIG. 2H can be combined into a single operation.

Figure 2H:
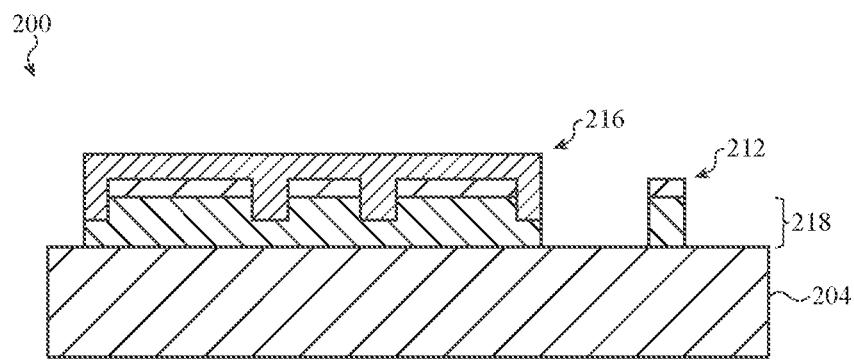
Figure 2I:
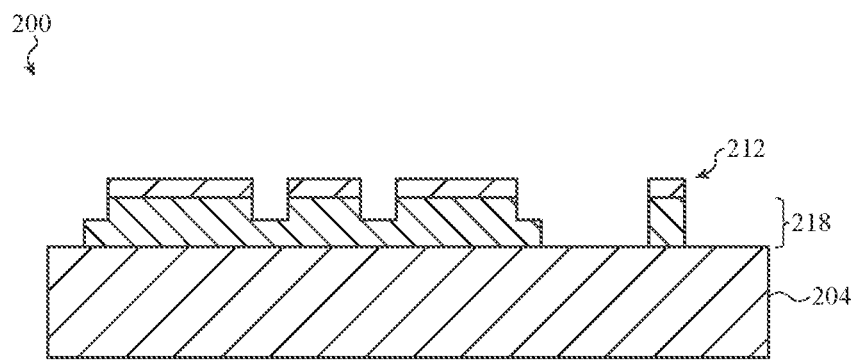

As shown in FIG. 2H, the lithographic mask 216 defines a pattern that can be leveraged by another etching process to singulate individual features of the patterned silicon layer 214. More specifically, this etching may be configured to etch through the patterned silicon layer 214 so as to define a set of crystalline silicon features 218. In regions with the lithographic mask 216 defined, the crystalline silicon features 218 (and finished or polished surface features thereof) is protected from the etch process. Likewise, in regions outside of the lithographic mask 216 with remaining oxide (e.g., the hardmask layer 212), the patterned silicon layer 214 is protected from the etch process by oxide. This implementation allows for a smooth optical transition between ridge (FIG. 2H, left) and strip (FIG. 2H, right) waveguides as, in this embodiment, an optical core is defined by the single lithographic step of FIG. 2C. This technique avoids degradation of silicon or other layers due to misalignment between lithography layers disposed at different times and/or with different processes or manufacturing stages. Furthermore, during a lateral transition between a strip waveguide and a ridge waveguide, the described process tolerates any misalignment of lithographic mask 216 (relative to already-defined features) to be as large as half of the strip waveguide width (FIG. 2H, right) at the point of transition. The set of crystalline silicon features 218 is formed onto and/or bonded with the oxide layer 204, as noted above. After the etching process is complete or otherwise terminated, the lithographic mask 216 may be removed, such as shown in FIG. 2I.

These foregoing embodiments depicted in FIGS. 2A-2I and the various alternatives thereof and variations thereto are presented, generally, for purposes of explanation, and to facilitate an understanding of various configurations and constructions of method of manufacturing an optical structure, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that the initial silicon oxide layer, the oxide layer 208, serves several purposes. Initially, the oxide layer 208 serves as a hardmask layer protecting silicon layers disposed below the oxide layer 208 (e.g., the silicon layer 206) thereby ensuring that the finished/polished surface of the silicon layer 206 (or other dielectric or functional layers) is not affected or roughened by etching steps. In addition, the oxide layer 208 permits and fosters the use of misalignment tolerant manufacturing processes. For example, by using the oxide layer 208 as a hardmask, proper alignment of subsequently-disposed photoresist and/or other lithographic masks may not be required.

For example, it may be appreciated that some of the foregoing steps may not be required of all embodiments. For example, the third etch process described in relation to FIGS. 2G-2I may not be required of all embodiments; for example in some constructions the second etch process described in reference to FIGS. 2E-2F may be continued through the silicon layer 206 to the oxide layer 204.

The process described in reference to FIGS. 2A-2I may be used to define at least one optical waveguide and/or one or more regions suitable for metallization and/or to receive one or more implants or implant patterns. However, as described below, processes associated with metallization and/or implantation may be delayed until after a SiN waveguide structure is also formed.

More generally, a person of skill in the art may appreciate the process described in reference to FIGS. 2A-2I may be characterized as a silicon on insulator process that defines one or more structural features into a silicon layer (e.g., the silicon layer 206). However, further operations that may be temperature sensitive and/or may result in temperature sensitive structures (e.g., implants, metallizations, and so on), as noted above, may be intentionally delayed until after further high-temperature processes are performed. One example high temperature process can include forming a SiN waveguide and associated cladding and annealing the same. Other high temperature processes may be performed in addition to and/or in place of the operations described below; it is appreciated that the simplified examples that follow are merely examples and may differ in other embodiments.

FIGS. 3A-3K depict sequential cross sections corresponding to intermediate steps of manufacturing the example simplified photonic integrated circuit of FIGS. 2A-2I, following at least a portion of a method of manufacturing a SiN waveguide, as described herein.

More generally, as with FIGS. 2A-2I, these figures depict progressive cross sections corresponding to intermediate stages of manufacture of silicon portions of an example optoelectric structure. In some cases, the operations shown in FIGS. 3A-3K can follow the operations shown in FIGS. 2A-2I, but this is not required of all embodiments.

Figure 3A:
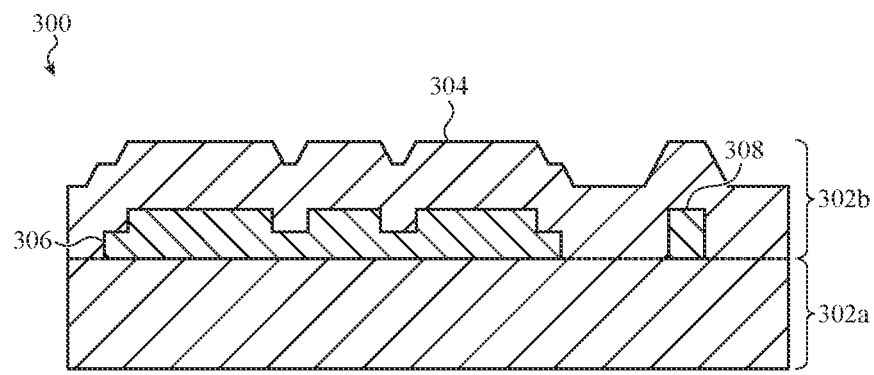
FIGS. 3A-3K depict sequential cross sections corresponding to intermediate steps of manufacturing the example simplified photonic integrated circuit of FIGS. 2A-2I, following at least a portion of a method of manufacturing a SiN waveguide, as described herein.

In particular, FIG. 3A depicts a cross section 300 of an intermediate stage of manufacturing of an optoelectric structure, such as the optoelectric structure shown in FIG. 1 and/or referenced with respect to FIGS. 2A-2I. As with other optoelectric structures, and intermediate manufacturing stages thereof, the depicted optoelectric structure can be formed at any suitable scale and a person of skill in the art may appreciate that relative size, dimensions, and/or layout of features varies from embodiment to embodiment and implementation to implementation.

More specifically, FIG. 3A depicts a cross section 300 formed from a starting substrate, such as shown in FIG. 2I, over which an oxide layer 302 is formed. The oxide layer 302 can be formed by any suitable process. In some examples, the oxide layer 302 is defined by discrete regions, such as an oxide region 302a (which may be thermal oxide, such as described above) and a deposited oxide region 302b, although this is not required of all embodiments. It may be appreciated that the oxide layer 302 can be formed in any suitable manner, at any suitable temperature, at any suitable pressure, in the presence of any suitable oxygen concentration, and so on. For simplicity of illustration and description, the hardmask layer 212 as shown in FIG. 2I is depicted within, and/or as a portion of the deposited oxide region 302b, as both layers are comprised of silicon oxides.

As with other layers described herein, the oxide layer 302 is shown as extending across an entire width of the starting substrate, but it may be appreciated that this is not required of all embodiments. For example, in some embodiments, the oxide layer 302 is formed in a pattern, for example by leveraging a local oxidation, masking, or deposition technique. As with other layers of material described herein, the oxide layer 302 can be formed to any suitable thickness. One example thickness is on the order of 800-1000 nanometers. In other cases, a thinner or a thicker layer of the oxide layer 302 may be formed. In many cases, a thickness of the oxide layer 302 is determined based on a mechanical or optical property of the oxide layer 302 at the selected thickness. In other words, a thickness of the oxide layer 302 may be determined so that the oxide layer 302 can provide optical property support to other layers of the optoelectric structure, whether such support is required for use in field or whether such support is required for subsequent manufacturing processes.

The oxide layer 302, and its various regions or areas however independently or simultaneously formed, can be selectively or entirely annealed or otherwise densified, thereby defining a silica cladding 304 that encapsulates and/or otherwise encloses one or more silicon features, such as a thermo-optic silicon structure 306 and a silicon waveguide 308.

As noted above, in some examples, the oxide layer 302 can be selectively annealed. For example, the oxide layer 302 may be annealed over the silicon waveguide 308 such that a dense or annealed portion of the oxide layer 302 defining the silica cladding 304 encloses only the silicon waveguide. In other cases, the reverse may be preferred; the oxide layer 302 can be densified over the thermo-optic silicon structure 306.

For simplicity of description and illustration, the silica cladding 304 as depicted and described herein may be annealed without selectivity; the entire oxide layer identified as the oxide layer 302 may be annealed at a material-specific temperature, for a desired or designed time period to achieve a particular post-anneal material property, optical characteristic, or other property.

As noted above, the silicon waveguide 308 and the thermo-optic silicon structure 306 can take any suitable shape or structure. It may be appreciated that the embodiment as shown is merely one example.

Figure 3B:
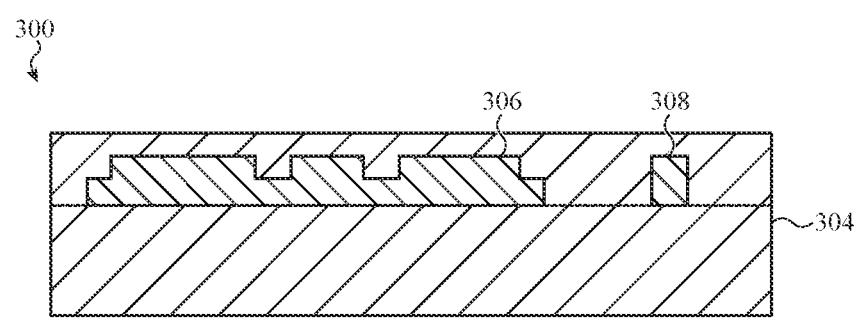

As shown in FIG. 3B, the silica cladding 304 can be smoothed, polished and/or otherwise planarized with a suitable process (e.g., chemical-mechanical polishing). In some examples, the silica cladding 304 is mechanically polished, whereas in other cases, the silica cladding 304 is chemically and/or mechanically polished. Laser etching may be employed in some implementations. These foregoing examples are not exhaustive and a person of skill in the art may readily appreciate that many suitable techniques can be used to form a flat surface in the silica cladding 304. The degree of flatness and/or the quality of the polish may also vary from embodiment to embodiment.

Figure 3C:
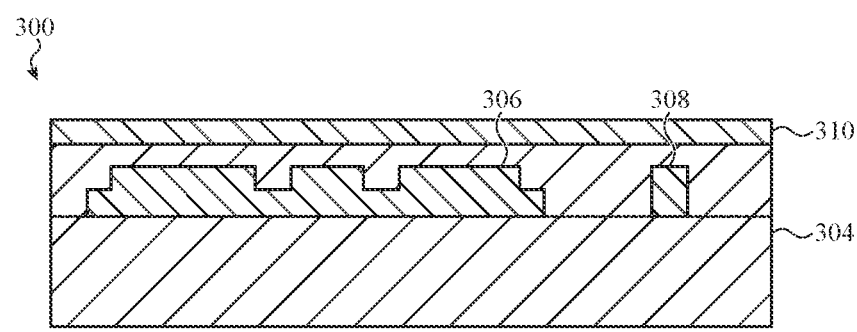

After polishing, the silica cladding 304 can be used as a substrate surface to receive a SiN layer 310, such as shown in FIG. 3C. The SiN layer 310 can be deposited in any suitable manner. In one example, the SiN layer 310 is disposed by low pressure chemical vapor deposition.

As with other layers described herein, the SiN layer 310 is shown as extending across an entire width of the starting substrate and the silica cladding 304, but it may be appreciated that this is not required of all embodiments. For example, in some embodiments, the SiN layer 310 is formed in a pattern, for example, by leveraging a lithographic masking or other local deposition technique. As with other layers of material described herein, the SiN layer 310 can be formed to any suitable thickness. One example thickness is on the order of 80-150 nanometers. In other cases, a thinner or a thicker layer of the SiN layer 310 may be formed. In many cases, a thickness of the SiN layer 310 is determined based on an optical or photonic property of the SiN layer 310 at the selected thickness.

Figure 3D:
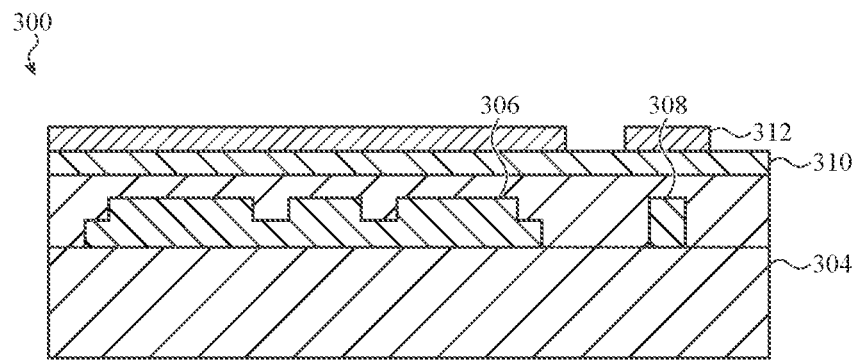

As shown in FIG. 3D, once the SiN layer 310 is formed over the silica cladding 304, a lithographic mask 312 can be disposed that is configured to define one or more features resulting from a subsequent subtractive manufacturing step (e.g., etching, mechanical ablation, laser ablation, and so on). As with other lithographic masks described herein, the lithographic mask 312 can be formed from, and/or may include, any suitable number of materials including resins, polystyrenes, lacquers, and so on including one or more photoactive additives or compounds.

In many cases, after the lithographic mask 312 is disposed on the surface of the SiN layer 310 (which may, optionally, be pre-treated to facilitate deposition of the lithographic mask 312; in some cases, the surface of the SiN layer 310 may be polished prior to deposition of the lithographic mask 312), it may be developed or otherwise cured by exposing the lithographic mask 312 and/or the entire stack-up to a curing condition dependent upon one or more properties of the lithographic mask 312 itself.

After, and/or as a portion of curing, the lithographic mask 312 may be exposed to light such as ultraviolet light after which a particular pattern may be defined onto the SiN layer 310. In some cases, subsequent cleaning of the lithographic mask 312 may be required or preferred, in particular to remove any uncured, undeveloped, or otherwise unnecessary portions of the lithographic mask 312.

In the illustrated embodiment, the lithographic mask 312 is a negative photoresist, but this may not be required of all embodiments. In other cases and other configurations, positive photoresist patterns may be used.

The lithographic mask 312 may be configured for use with a lithographic process, such as photolithography (configured to operate in either ultraviolet or visible light or any suitable band of light). In such examples, the lithographic mask 312 may be a photoresist layer disposed using a suitable technique.

As noted above, the lithographic mask 312 can be formed by any suitable process. As with other layers, depositions, formations, or features described herein, the lithographic mask 312 is shown as extending in a particular defined pattern across a majority of a width of the stack-up, but it may be appreciated that this is not required of all embodiments. In some cases, the lithographic mask 312 may define a localized pattern only.

In addition, as with other layers of material described herein, the lithographic mask 312 can be formed to any suitable thickness, which may vary from process to process. One example thickness is on the order of 50-400 nanometers. In other cases, a thinner or a thicker layer of the lithographic mask 312 may be formed.

Figure 3E:
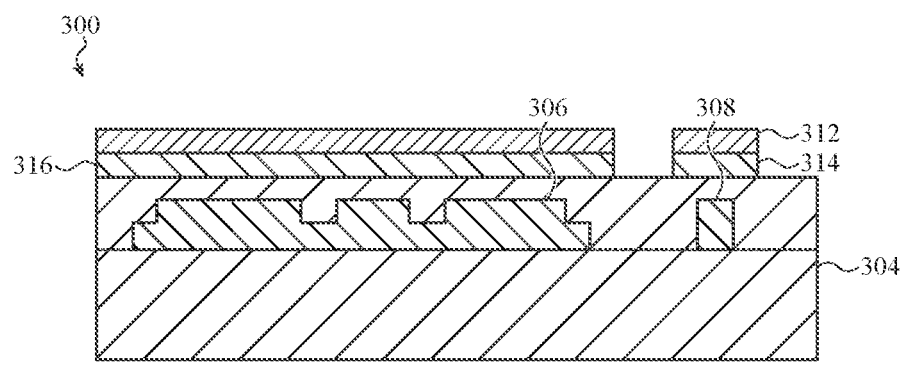

FIG. 3E depicts the substrate of FIG. 3D, after etching through apertures defined by the lithographic mask 312. The etching operation, a result of which is shown in FIG. 3E, may have any suitable selectivity and any suitable isotropy/anisotropy. The etch may be a wet etch process or a plasma-phase process, and selection therebetween (or of another process or process type) may be based at least in part on design or manufacturing constraints.

For simplicity of description and illustration, as with other embodiments presented herein, the result of the etch process shown in FIG. 3E depicts a highly selective, anisotropic etch through the SiN layer 310. In more simple terms, the etch of FIG. 3E proceeds linearly downward through the pattern defined by the lithographic mask 312 (e.g., negative space in which no mask material is present), and does not isotopically intrude below portions of the lithographic mask 312 to a significant extent. Further, the process is selective in that only the material of the SiN layer 310 is etched. It may be appreciated, however, that this is merely one (idealized and simplified) example and, in many cases, and/or in real implementations, different results may be achieved.

More broadly in view of the foregoing, any suitable etching process suitable for use with the lithographic mask 312 may be used. In some cases, a wet etch can be performed, such as a phosphoric acid etch. In other cases, a buffered etch process may be performed. In yet other cases, laser etching, ablation, or mechanical etching may be suitable. A person of skill in the art may readily appreciate that suitable etching processes may differ from implementation to implementation and embodiment to embodiment.

The etch process may be terminated and/or stopped once a desired depth is achieved. In other cases, such as shown, the SiN layer 310 is etched entirely through, stopping at the silica cladding 304. As noted above, the termination of the etch may be defined, at least in part, by a selectivity of the etchant or etching process. More specifically, the etchant or technique may be selective in that it is reactive only with the material of the SiN layer 310.

Figure 3F:
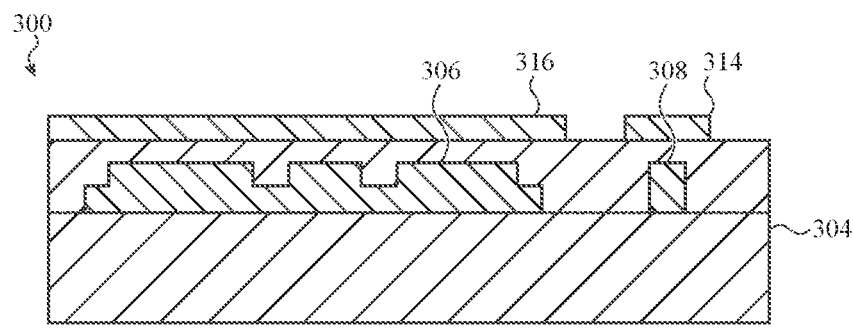

Regardless of the process (or process characteristics, such as etchant, duration, temperature, pressure, and so on) selected to leverage the pattern defined by the lithographic mask 312 to etch through the SiN layer 310, once the etch is completed, a set of SiN structures may be defined. More specifically, once the SiN layer 310 is patterned according to the lithographic mask 312, a SiN waveguide 314 may be formed along with a SiN etch-stop layer 316. Thereafter, as shown in FIG. 3F, remaining portions of the lithographic mask 312 may be removed in a suitable process. In some cases, the SiN layer 310 may be annealed although this may not be required of all embodiments. In some embodiments, the SiN layer 310 may be selectively annealed. For example, in some constructions, the SiN waveguide 314 may be annealed only. In other cases, the SiN etch-stop layer 316 can be annealed only. A person of skill in the art may appreciate that different designs may prefer different operations.

Figure 3G:
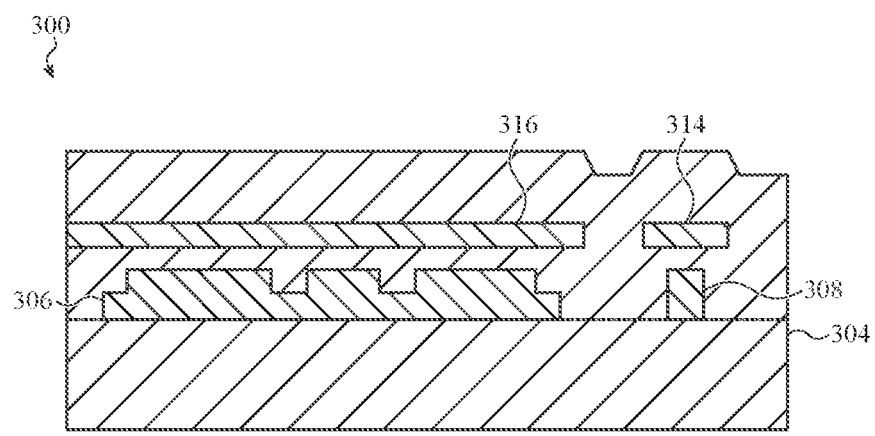

Once the lithographic mask 312 is removed, and the SiN waveguide 314 and the SiN etch-stop layer 316 are defined (and optionally annealed or otherwise hardened or post-processed in some manner) over the thermo-optic silicon structure 306 and the silicon waveguide 308, another oxide layer can be added over, and/or grown from, the silica cladding 304, thereby extending the silica cladding 304 over the SiN waveguide 314 and the SiN etch-stop layer 316, such as shown in FIG. 3G. In many cases, the extended thickness of the silica cladding 304 can be selected at least in part based on an optical property of the silica cladding 304. For example, the thickness may be selected, at least in part, to reduce transition losses and/or propagation losses of light traversing the SiN waveguide 314, the silicon waveguide 308, the thermo-optic silicon structure 306, and/or transitions therebetween.

Once deposited, the extended region of the silica cladding 304 may be annealed or densified.

Figure 3H:
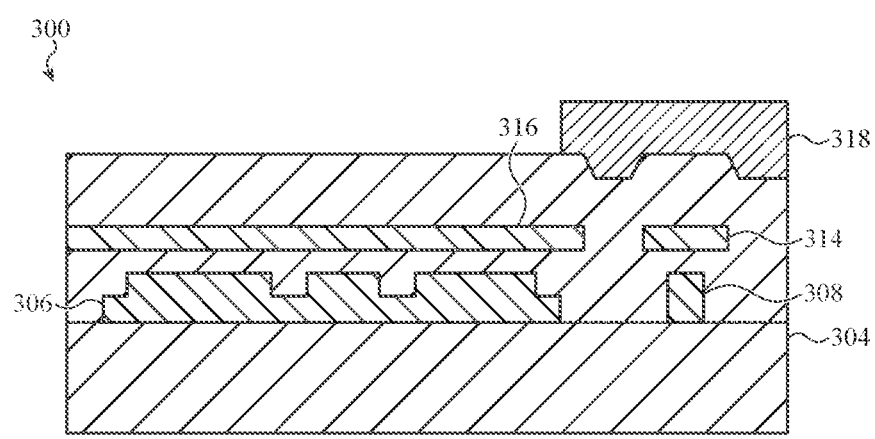

Thereafter, as shown in FIG. 3H, a lithographic mask 318 can be disposed on an upper surface of, or over a portion of, the silica cladding 304 over the SiN waveguide 314. As with other masks described herein, the lithographic mask 318 can have any suitable pattern or shape and may be cured and/or prepared in any suitable manner.

Figure 3I:
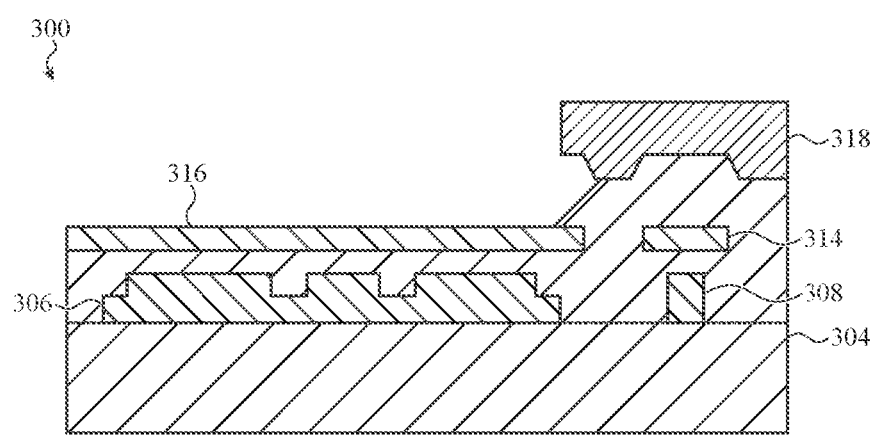
Figure 3J:
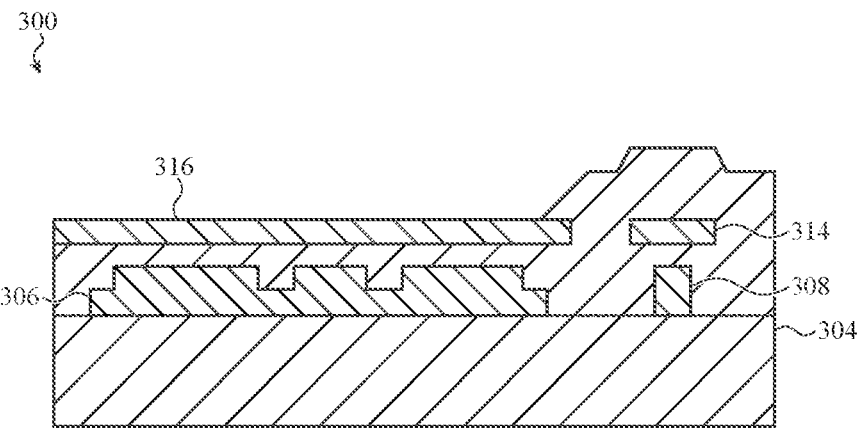

With reference to FIG. 3I, once the lithographic mask 318 is deposited, an etching process may be used to reduce the thickness of the silica cladding 304 above the thermo-optic silicon structure 306. In particular, in many embodiments, the etching process may be a wet etching process that is selective to silicon dioxide (e.g., hydrofluoric acid etch). As a result, the etching process may chemically terminate at the SiN etch-stop layer 316. In another phrasing, the previously deposited SiN layer may be used to define the SiN waveguide 314, but also an etch-stop layer, namely the SiN etch-stop layer 316. The etch in FIG. 3I may also be achieved through plasma-based etching processes, or a combination of plasma-based and wet etch steps. Thereafter, the lithographic mask 318 can be removed, such as shown in FIG. 3J.

Figure 3K:
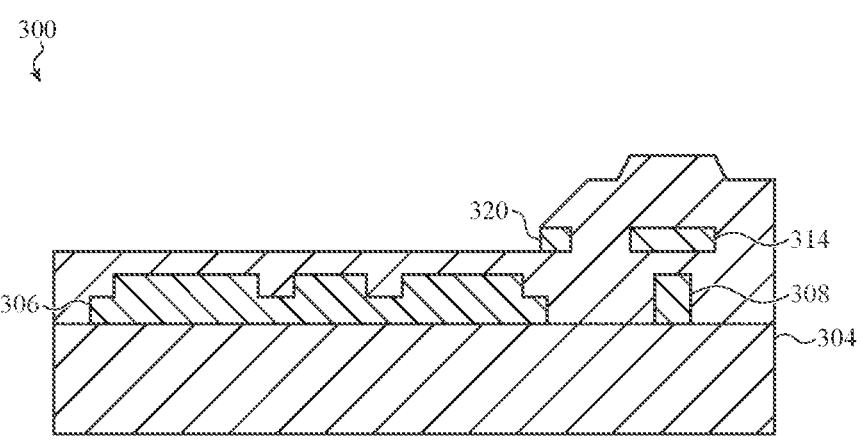

Once the SiN etch-stop layer 316 has served its purpose to serve as a highly-accurate etch stop layer guiding the foregoing described etching process, the SiN etch-stop layer 316 may be optionally removed, such as shown in FIG. 3K. The SiN etch-stop layer 316 can be removed by etching, such as by dry etching. Many suitable methods are possible, and selection therefrom may vary from embodiment to embodiment. In some cases, a residual portion 320 of the SiN etch-stop layer 316 may be left behind, but this is not required of all embodiments. In some cases, the residual portion 320 serves as a lateral etch-stop or other protective sacrificial layer to ensure that the Si waveguide 306 is unaffected by etching processes.

These foregoing embodiments depicted in FIGS. 3A-3K and the various alternatives thereof and variations thereto are presented, generally, for purposes of explanation, and to facilitate an understanding of various configurations and constructions of method of manufacturing an optical structure, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that some of the foregoing steps may not be required of all embodiments. Generally and broadly, the process described in reference to FIGS. 3A-3K may be used to define at least one annealed SiN waveguide with precise placement relative to at least one crystalline silicon waveguide. Such alignment is achieved, at least in this example, by avoiding bonding processes that require mechanical alignment of multiple substrates, for example, a first substrate with a SiN waveguide and a second substrate with a Si waveguide.

FIGS. 4A-4K depict sequential cross sections corresponding to intermediate steps of manufacturing the example simplified photonic integrated circuit of FIGS. 2A-2I, following at least a portion of a method of manufacturing temperature-sensitive semiconductor or metalized structures, as described herein.

More generally, as with preceding described embodiments, these figures depict progressive cross sections corresponding to intermediate stages of manufacture of silicon nitride portions of an example optoelectric structure. In some cases, the operations shown in FIGS. 4A-4K can follow the operations shown in FIGS. 2A-3K, but this is not required of all embodiments.

Figure 4A:
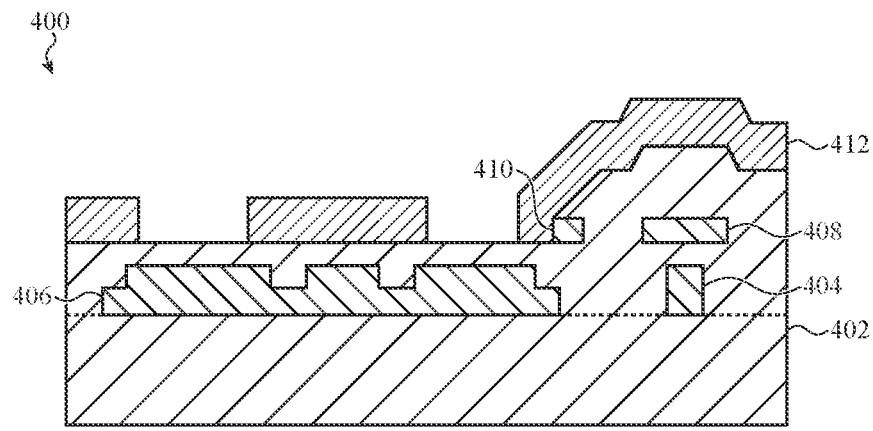
FIGS. 4A-4K depict sequential cross sections corresponding to intermediate steps of manufacturing the example simplified photonic integrated circuit of FIGS. 2A-3K, following at least a portion of a method of manufacturing temperature-sensitive semiconductor or metalized structures, as described herein.

In particular, FIG. 4A depicts a cross section 400 of an intermediate stage of manufacturing of an optoelectric structure, such as the optoelectric structure shown in FIG. 1 and/or referenced with respect to FIGS. 2A-3K. As with other optoelectric structures, and intermediate manufacturing stages thereof, the depicted optoelectric structure can be formed at any suitable scale and a person of skill in the art may appreciate that relative size, dimensions, and/or layout of features varies from embodiment to embodiment and implementation to implementation.

More specifically, FIG. 4A depicts a cross section 400 formed from a starting substrate, such as the substrate shown in FIG. 3K. The starting substrate includes a silica cladding 402 that encloses and protects a silicon waveguide 404, a thermo-optic silicon structure 406, a SiN waveguide 408, and optionally a residual portion of silicon nitride 410. In some cases, the residual portion of silicon nitride 410 may serve a functional purpose (e.g., such as of a portion of a delay line or other optical structure or waveguide), but this is not required of all embodiments. FIG. 4A also depicts a lithographic mask 412 disposed to define a pattern over the silica cladding 402. The lithographic mask 412 can be configured to any suitable thickness, with any suitable process or combination of processes. More generally, the lithographic mask 412 can be disposed in a similar manner as described above with reference to other lithographic masks described herein; this description is not repeated.

Figure 4B:
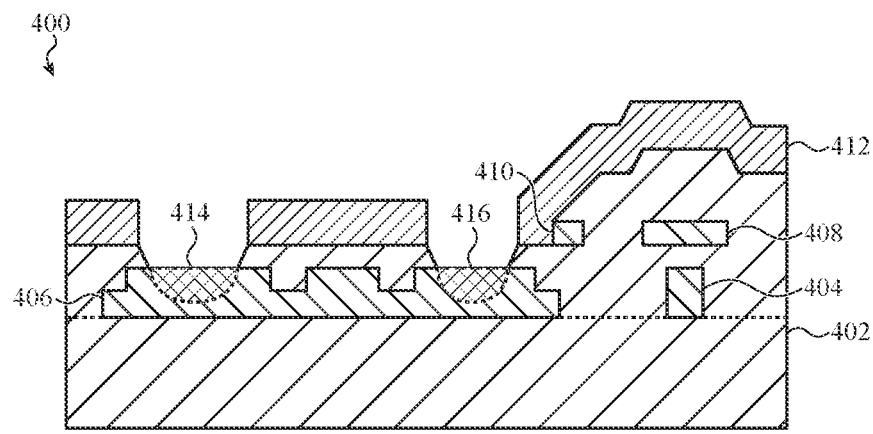

As shown in FIG. 4B, an etching process can follow deposition of the lithographic mask 412. The etching process may be selective to silicon dioxide such that etching terminates at a top surface of the thermo-optic silicon structure 406. In other cases, the etching process may be controlled so that a trench formed by the etching process may terminate at a top surface of the thermo-optic silicon structure 406.

In many examples, (see, e.g., FIG. 2F) the thermo-optic silicon structure 406 can be formed to define one or more elevated landing regions. These portions of the thermo-optic silicon structure 406 may be formed to a particular thickness that increases the substrate's tolerance to imprecise timing and/or execution of the etching process. More simply, the thermo-optic silicon structure 406 can be formed with increased thickness so that subsequent etching operations have a greater margin of depth error. In other embodiments these raised landing regions are not necessary and may be omitted, depending on the oxide thickness, silicon thickness, and etch process selectivity.

In some cases, the etch may be a wet etch although this is merely one example and other etching processes may be suitable.

Figure 4C:
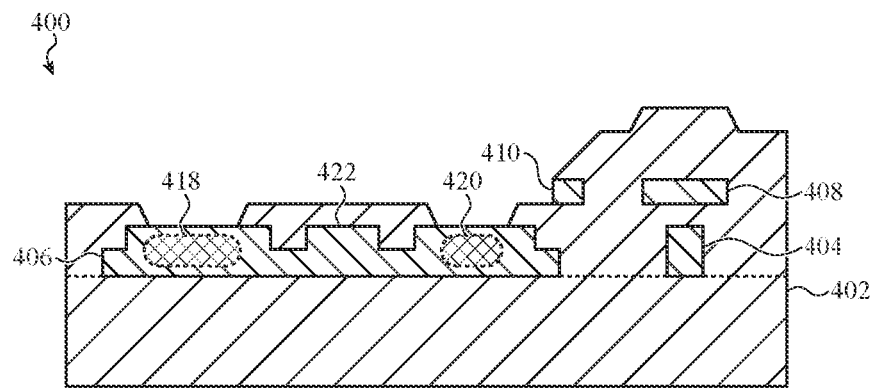

As shown in FIG. 4B, a result of the etching process may be to expose previously-formed silicon surfaces of the thermo-optic silicon structure 406. More specifically, the etch results in a trench (which may be local and/or which may extend across a length of the thermo-optic silicon structure 406). The trenches defined by the lithographic mask 412 expose an upper surface of the thermo-optic silicon structure 406, thereby enabling the implants 414, 416 to be disposed into the thermo-optic silicon structure 406. Any suitable implantation technique can be used to define the implants 414, 416. The lithographic mask 412 may be removed before or after implantation. After implantation, the implants 414, 416 may be activated using a suitable process, such as rapid thermal activation. Once activated, such as shown in FIG. 4C, the thermo-optic silicon structure 406 includes two regions of known, low, resistance. In FIG. 4C, these regions are identified as the first conductive region 418 and the second conductive region 420.

As may be appreciated by a person of skill in the art, an application of current through the first conductive region 418 and the second conductive region 420 generates heat in a controllable and predictable manner. This thermal energy may conduct, at least in part, to a central region of the thermo-optic silicon structure 406, defining a silicon waveguide 422. As may be known to a person of skill in the art, a silicon waveguide introduces a phase shift in light passing therethrough if heated. Thus, in this manner, the thermo-optic silicon structure 406 comprises two electrically-controllable heaters (e.g., the first conductive region 418 and the second conductive region 420) flanking the silicon waveguide 422. By applying a current through the first conductive region 418 and the second conductive region 420, precise control of phase of any light passing through the silicon waveguide 422 can be achieved.

The first conductive region 418 and the second conductive region 420 are shown as having different widths and/or other dimensions, but this is not required (or preferred) in some embodiments. In some cases, the dimensions of the first conductive region 418 and the second conductive region 420 may be preferably identical.

Figure 4D:
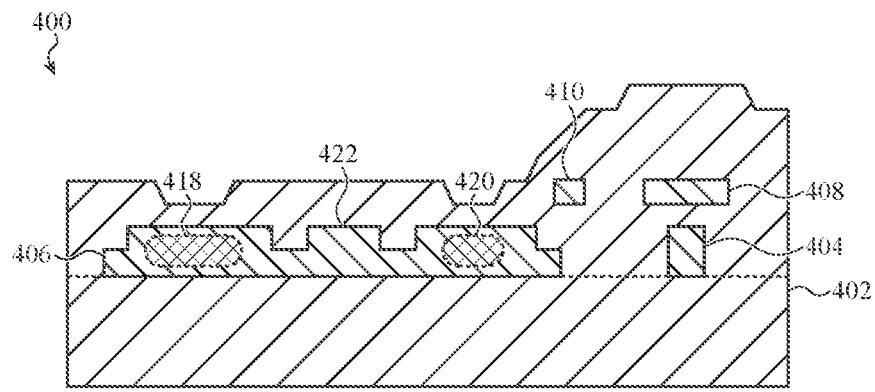

Once the first conductive region 418 and the second conductive region 420 are formed/defined into the thermo-optic silicon structure 406, another silicon dioxide layer or other insulating layer can be disposed over the stack-up. For example, as shown in FIG. 4D, an oxide layer can be deposed over the silica cladding 402, the silicon waveguide 404, the thermo-optic silicon structure 406, and the SiN waveguide 408.

The oxide layer can have any suitable thickness. In some examples, the oxide layer is 300-600 nm thick, but this is merely an example. In addition, as with other examples, the oxide layer may extend across the entire stack-up or may be selectively/locally disposed.

Figure 4E:
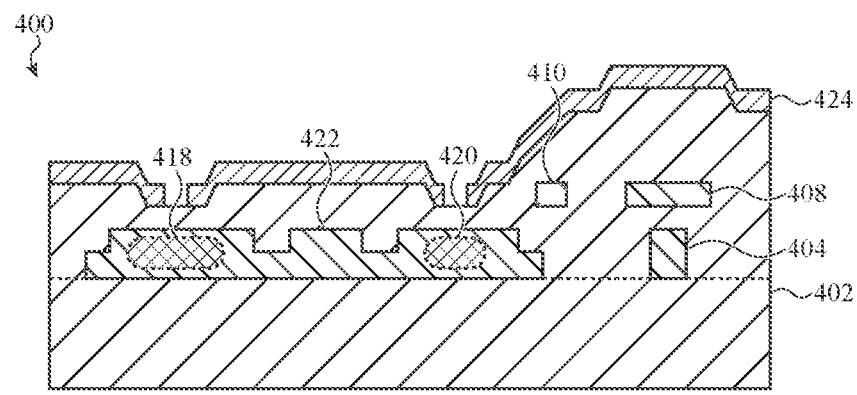

After the oxide layer is disposed over the substrate, a lithographic mask 424 can be disposed over the substrate, such as shown in FIG. 4E. The lithographic mask 424 may be configured in the same manner as other masks described herein.

Figure 4F:
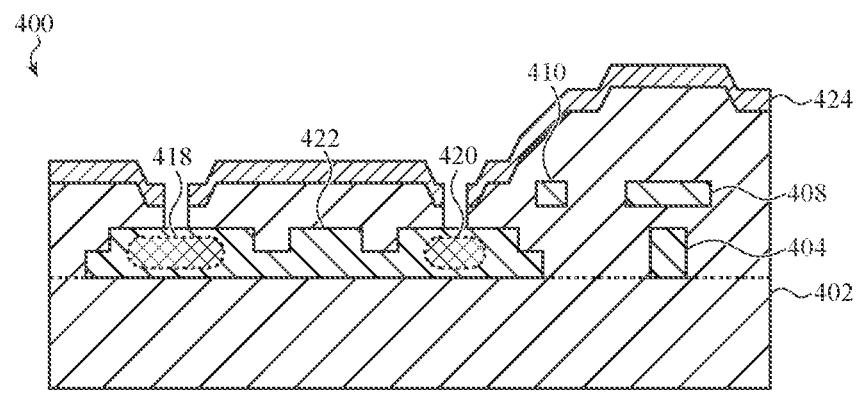
Figure 4G:
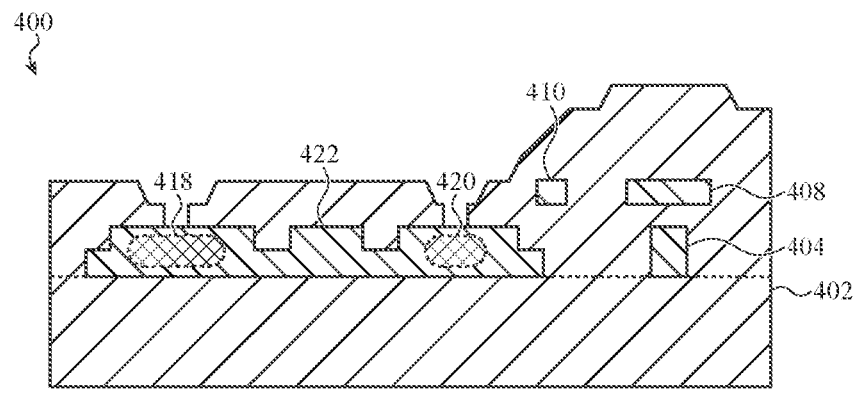
Figure 4H:
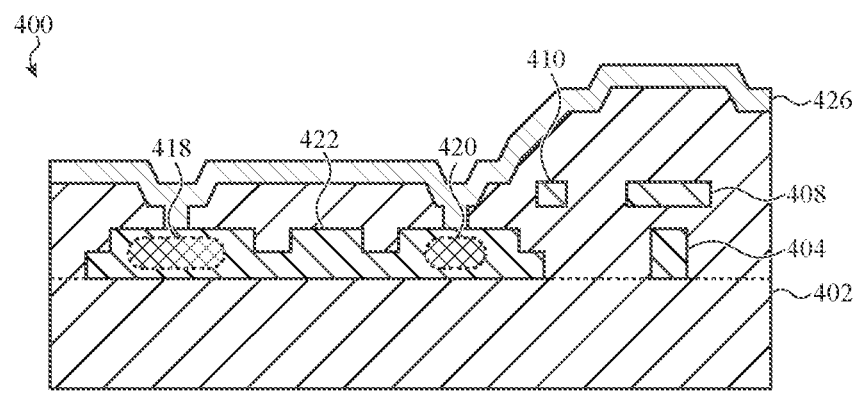

Following deposition of the lithographic mask 424, at least a portion of the silica cladding 402 exposed by the pattern defined by the lithographic mask may be etched to expose at least a portion of both the first conductive region 418 and the second conductive region 420, such as shown in FIG. 4F. Thereafter, the lithographic mask 424 may be removed using a suitable technique, such as shown in FIG. 4G.

The exposed portions of the first conductive region 418 and the second conductive region 420 can be thereafter metallized so as to form electrical connections to the first conductive region 418 and the second conductive region 420 from an upper surface of the silica cladding 402.

In order to form contacts to conductively couple to the first conductive region 418 and the second conductive region 420, a metal layer 426 (see, e.g., FIG. 4H) can be disposed over the vias (or aperture, or window) defined by the lithographic mask 424 and the subsequent etching operation associated therewith.

The metal layer 426 can be formed in any suitable manner from any suitable electrically conductive material. In some embodiments, the metal layer 426 may be sputtered whereas, in other cases, the metal layer 426 may be disposed via chemical vapor deposition or evaporation. Example metals include aluminum, gold, platinum, titanium, tungsten, and so on or any alloys thereof. In some examples, different metals may be used as contacts for the first conductive region 418 and the second conductive region 420. It may be appreciated that these foregoing examples are not exhaustive of the various methods by which a contact can be formed to conductively couple to either or both the first conductive region 418 and the second conductive region 420.

The metal layer 426 is shown as extending across an entire width of the silica cladding 402, but it may be appreciated that this is not required of all embodiments. For example, in some embodiments, the metal layer 426 is formed in a pattern over the silica cladding 402 (and/or into the silica cladding 402), for example by leveraging a local deposition technique. As with other layers of material described herein, the metal layer 426 can be formed to any suitable thickness. One example thickness is on the order of 1-10 micrometers. In other cases, a thinner or a thicker layer of the metal layer 426 may be formed.

In many cases, a thickness of the metal layer 426 is determined based on an electrical property or mechanical property of the metal layer 426 at the selected thickness (e.g., contact resistance, and so on). In other words, the thickness and/or layout of the metal layer 426 may be determined so that the metal layer 426 can provide mechanical or electrical support or functionality to other layers of the optoelectric structure, whether such support is required for use in field or whether such support is required for subsequent manufacturing processes.

Figure 4I:
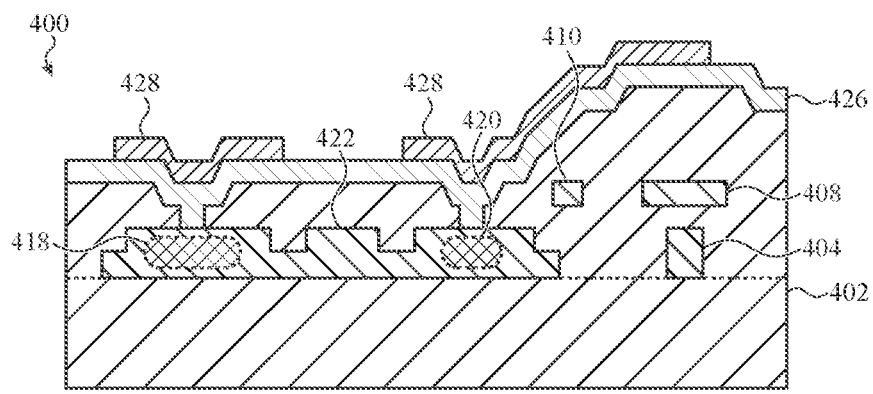
Figure 4J:
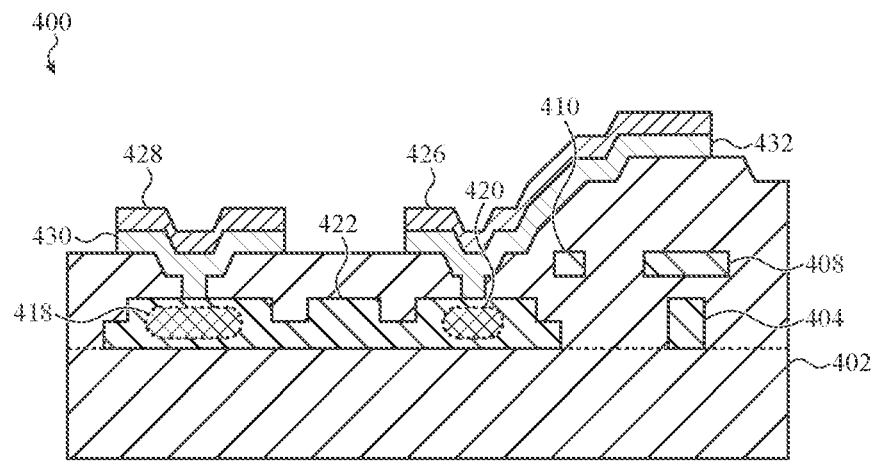

The metal layer 426 can be divided or patterned to define two or more contacts, so that the first conductive region 418 and the second conductive region 420 are not conductively coupled. In particular, as shown in FIG. 4I, a lithographic mask 428 can be disposed over the metal layer 426 which, in turn, may define an etch pattern singulating individual electrodes from the metal layer 426. For example, as shown in FIG. 4J, an etching process can be performed through the metal layer to define a first electrical contact 430 conductively coupled to the first conductive region 418 and a second electrical contact 432 conductively coupled to the second conductive region 420. In some cases, the electrical contacts may be tungsten plugs. After removing the lithographic mask 428, the optoelectronic component manufacturing may be substantively complete, subject to finishing operations such as cleaning, polishing and/or coupling to other optical or electrical circuits (see, e.g., FIG. 4K).

These foregoing embodiments depicted in FIGS. 4A-4K and the various alternatives thereof and variations thereto are presented, generally, for purposes of explanation, and to facilitate an understanding of various configurations and constructions of method of manufacturing an optical structure, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4K:
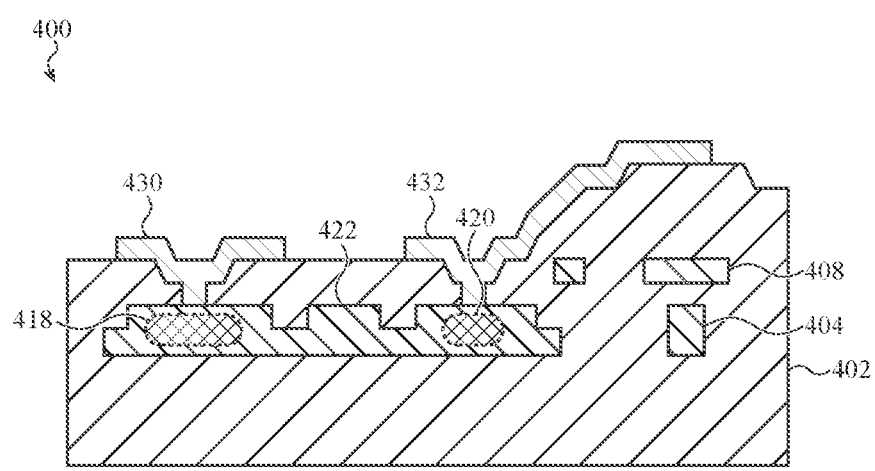

For example, generally and broadly, it may be appreciated that the optoelectronic component depicted in FIG. 4K may result from the sequence of steps described in reference to FIGS. 2A-4K includes at least one annealed SiN waveguide, multiple crystalline silicon waveguides, and a thermo-optical heating element. As known to a person of skill in the art, each of these discrete functional photonic and/or electronic circuit components are formed at different times and in a particular order so that annealing operations of particular materials (e.g., SiN, $SiO_2$, and so on) can be performed, thereby improving optical performance of those materials, without potentially damaging temperature-sensitive components, such as metallized electrical contacts or implant regions.

As such, generally and broadly, the method(s) of manufacturing described in reference to FIGS. 2A-4K may be summarized as: (1) define silicon structures; (2) bury silicon structures in annealed silica; (3) define annealed SiN structures; (4) bury SiN structures in annealed silica; (5) trench through the silica to expose the silicon structures; and (6) complete temperature-sensitive or lower-temperature manufacturing or fabrication processes within the trench.

Furthermore, although the embodiments described above reference manufacturing steps for a thermo-optic silicon structure, it may be appreciated that this is merely one electronic structure that may be defined using the steps and methods described herein. In particular, it may be appreciated that any suitable electronics manufacturing operations can occur within the trenches formed after formation of annealed SiN waveguides and annealed claddings. Conventional complementary metal oxide semiconductor fabrication methods may be used to define any suitable digital, analog, or optical circuitry, fan-out, fan-in, multi-layer or single-layer circuitry, and so on.

In addition, trenching as described above with reference to FIGS. 4A-4B may not be required of all embodiments. In some examples a single trench that exposes an entire upper surface of a buried silicon structure can be used.

Similarly, it may be appreciated that the orientation of the various waveguides depicted is merely one example. In other cases, other waveguides may be formed including but not limited to ridge waveguides, buried waveguides, diffused waveguides, rib waveguides, slot waveguides, triploaded waveguides, anti-resonant reflecting optical waveguides, waveguide tapers, waveguide transitions, and so on.

In addition, it may be appreciated that the optical and electrical structures described herein need not follow rectilinear paths, such as shown in FIG. 1. Instead, a person of skill in the art appreciates that the various manufacturing steps described herein can be used to define any suitable curvature, shape, or path for any of the described functional or structural features referenced above.

Figure 5:
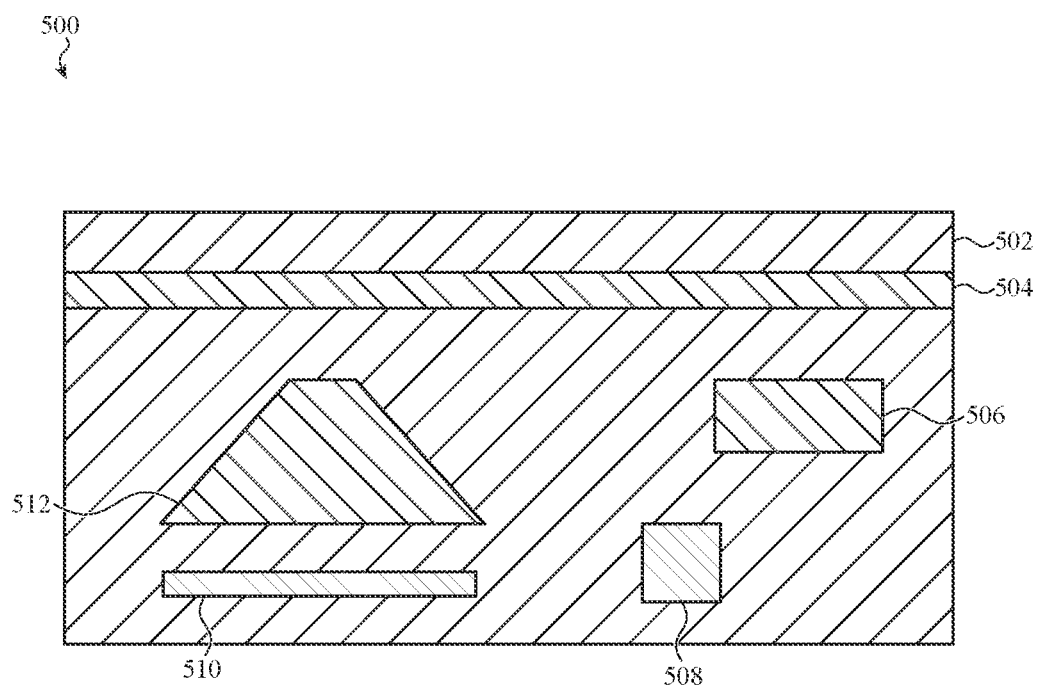
FIG. 5 depicts a simplified example cross section of a portion of a photonic integrated circuit that includes multiple waveguides, formed from different materials and in different shapes, that may be manufactured according to methods described herein.

For example, FIG. 5 depicts a simplified example cross section of a photonic integrated circuit that can include multiple, differently-oriented, differently-shaped, waveguides that are and/or may be formed from different materials. For example, in this simplified example 500, an annealed silicon oxide layer 502 can encapsulate multiple waveguides such as, but not limited to, the manufactured features 504, 506, 508, 510, and 512. These depicted manufactured features can be waveguides, silicon/CMOS electronics, or any combination thereof. For example, some of the manufactured features 504-512, may be defined as waveguides formed from SiN, silicon, or from other suitable implementation-specific materials. In other cases, any one or more of the manufactured features 504-512 can include one or more electronic or electrical circuit components such as transistors, resistors, capacitors, traces, sensors, microelectromechanical devices, digital circuits, analog circuits, fan-out, vias, electrodes, and so on. The manufactured features 504-512 can have any suitable shape, can be formed from any suitable material, may have varying or constant cross section, can include one or more curves or straight edges or surface features, can be associated with photonic circuits and/or electrical circuits, and so on. These foregoing examples are not exhaustive; a person of skill in the art may readily appreciate that FIG. 5 provides merely one example of how any suitable photonic and/or electronic circuits can be manufactured according to methods described herein which enable high-temperature and low-temperature elements to be formed proximate to one another.

More generally, FIG. 5 is presented to clearly illustrate that in some examples, multiple waveguides can be stacked, layered or otherwise disposed over one another. For example, multiple SiN waveguides can be stacked atop one another, optionally separated by oxide layers, which may be annealed oxide layers. In some cases, SiN waveguides defined using processes defined herein can include one or more tapered regions (see, e.g., FIG. 1) that linearly or non-linearly decrease in width across a particular length of the SiN waveguide. In such examples, one SiN waveguide in a first layer may taper toward a second SiN waveguide defined in a second layer. The two waveguides may be substantially parallel (in each respective layer) or may occupy paths that intersect in a non-parallel manner in the tapered regions. In other cases, crystalline silicon waveguides can be formed alongside, above, or below one or more SiN waveguides as described herein. Some waveguides as described herein may terminate at a facet configured to interface, either directly or indirectly (e.g., via one or more lenses or other optical structures or adapters) to an end facet of an optical fiber. In other cases, some waveguides as described herein may be configured to terminate at a light emitting element, such as a laser diode.

In view of the foregoing, a person of skill in the art may readily appreciate that the manufacturing techniques described herein can be leveraged to co-manufacture different structures that have different thermal tolerance. For example, CMOS structures or other electronic structures can be manufactured after high-temperature processes, such as annealing processes and others, are performed.

Figure 6:
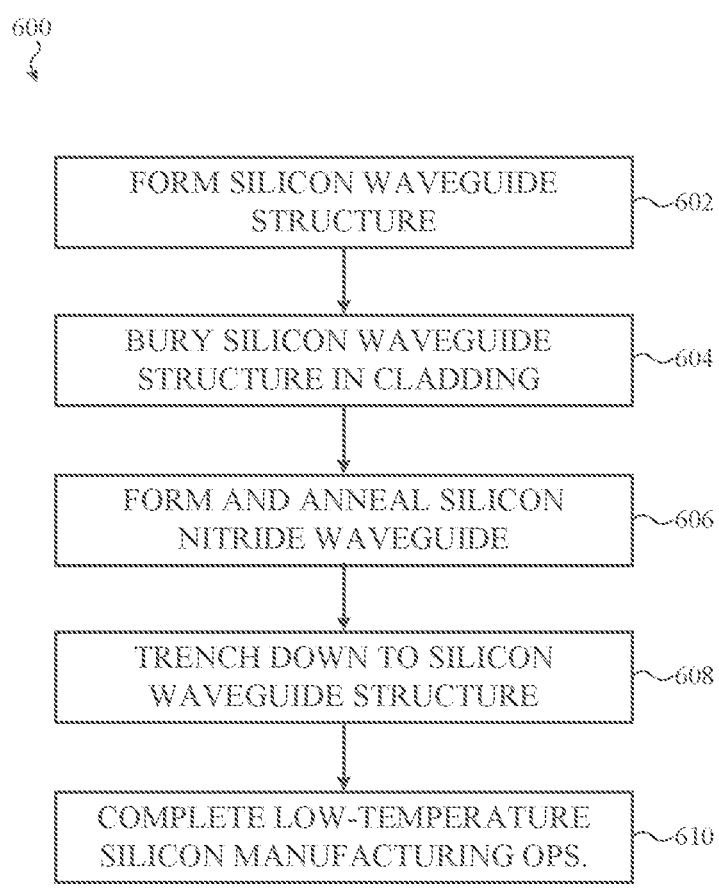
FIG. 6 is a flowchart depicting example operations of a method of co-manufacturing silicon waveguides, SiN waveguides, and semiconductor structures in a photonic integrated circuit, such as described herein.

FIG. 6 is a flowchart depicting example operations of a method of co-manufacturing silicon waveguides, SiN waveguides, and semiconductor structures in a photonic integrated circuit, such as described herein. The method 600 includes operation 602 at which a silicon waveguide structure is formed using a suitable process. The waveguide can be formed from a silicon on insulator substrate or in another suitable manner (see, e.g., FIGS. 2A-2I). The method 600 also includes operation 604 during which the silicon waveguide structure is buried in an oxide layer, which is thereafter annealed to form a cladding. (see, e.g., FIGS. 3A-3B). Hereafter, the method 600 advances to operation 606 at which a SiN waveguide is formed and annealed within a corresponding cladding. (see, e.g., FIGS. 3C-3G). Next, at operation 608, trenches are formed through the cladding to expose an outer surface of the silicon waveguide structure. Finally, at operation 610, one or more lower-temperature silicon manufacturing or CMOS manufacturing operations can be performed to or with the exposed surface of the silicon waveguide structure.

The foregoing method corresponds, generally and broadly, to the iterative fabrication steps presented and described in reference to FIGS. 2A-4K. However, it may be appreciated that this is merely one example. In other cases, multi-substrate fabrication methods may be used in a bonding process.

Figure 7:
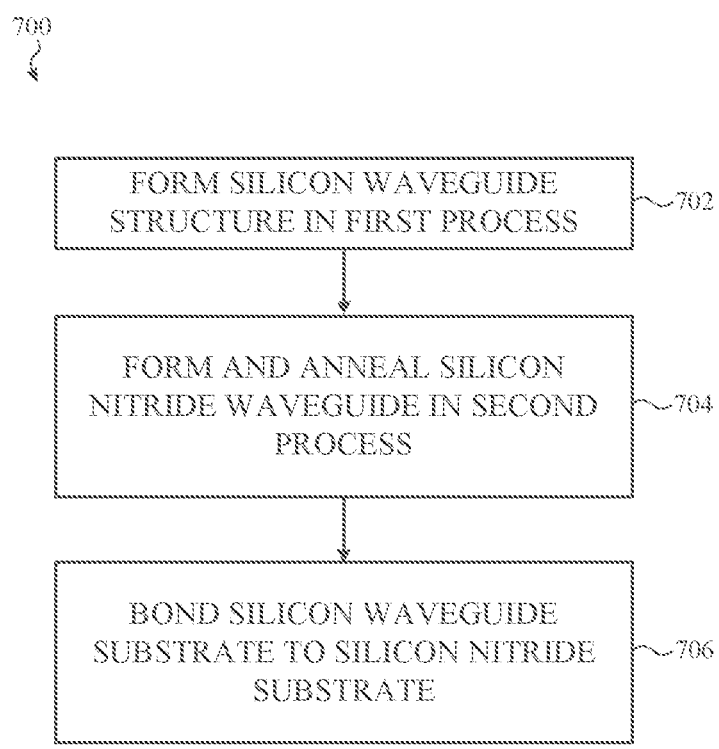
FIG. 7 is a flowchart depicting example operations of a method of manufacturing a photonic integrated circuit using a bonding process, such as described herein.

FIG. 7 is a flowchart depicting example operations of a method of manufacturing a photonic integrated circuit using a bonding process, such as described herein. The method 700 includes operation 702 at which a first process is used to form a silicon waveguide and/or one or more semiconductor structures. At operation 704, a second process or substrate may be used to form a silicon nitride waveguide. The silicon nitride waveguide may be annealed, along with an associated cladding. Finally, at operation 706, a product of the first process and a product of the second process may be bonded together to form a single photonic and/or optoelectronic structure including both SiN waveguides and silicon crystal waveguides.

In some further examples, the first substrate of method 700 can be bonded to the second substrate before an annealing process. Once bonded, the combined substrates may be annealed together, after which a trenching operation can be performed such as described above with reference to FIGS. 4A-4K to perform one or more silicon or CMOS manufacturing/fabrication operations.

These foregoing embodiments depicted in FIGS. 6-7 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

A photonic circuit or optical circuit such as described herein can be incorporated into any suitable computing device or computing resource. As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

What is claimed is:

1. A method of manufacturing a hybrid photonic integrated circuit, the method comprising:
    forming a silicon structure over a base substrate;
    burying the silicon structure in a first dielectric layer;
    forming a silicon nitride structure over the first dielectric layer;
    burying the silicon nitride structure in a second dielectric layer;
    trenching through at least the first dielectric layer to expose a surface of the silicon structure;
    implanting the surface with an implant and activating the implant;
    disposing a third dielectric layer over the surface;
    defining a via through the third dielectric layer; and
    conductively coupling through the via to the surface of the silicon structure.

2. The method of claim 1, wherein the silicon structure comprises a silicon waveguide.

3. The method of claim 1, wherein the silicon nitride structure comprise a silicon nitride waveguide.

4. The method of claim 1, comprising:
    annealing the first dielectric layer; and
    after annealing the first dielectric layer, polishing the first dielectric layer.

5. The method of claim 4, comprising:
    annealing the silicon nitride structure; and
    after annealing the silicon nitride structure, burying the silicon nitride structure in the second dielectric layer.

6. The method of claim 5, comprising annealing the second dielectric layer prior to trenching.

7. The method of claim 1, comprising forming a metal layer over the third dielectric layer, the metal layer defining an electrical contact conductively coupled to the surface of the silicon structure through the via.

8. The method of claim 1, wherein trenching through at least the first dielectric layer comprises chemically etching the first dielectric layer above the surface of the silicon structure.

9. The method of claim 1, comprising trenching through both the first dielectric layer and the second dielectric layer to expose the surface of the silicon structure.

10. The method of claim 1, wherein the surface of the silicon structure is a portion of a thermo-optic heater element.

11. The method of claim 1, wherein the silicon nitride structure is positioned over and at least partially aligned with the silicon structure that light confined by a first waveguide defined by the silicon nitride structure can couple into a second waveguide defined by the silicon structure.

12. The method of claim 11, wherein the first waveguide is separated from the second waveguide by the first dielectric layer.

13. A method of manufacturing a hybrid photonic integrated circuit, the method comprising:
    defining a silicon structure on an insulator layer;
    burying the silicon structure in a first dielectric layer;
    annealing the first dielectric layer;
    forming a silicon nitride layer on the first dielectric layer;
    burying the silicon nitride layer in a second dielectric layer;
    annealing the second dielectric layer;
    disposing a lithographic mask over a silicon waveguide and a silicon nitride waveguide;
    selectively etching the annealed first and second dielectric layers to expose a portion of the silicon nitride layer;
    removing the portion of the silicon nitride layer;
    trenching through a portion of the first dielectric layer below the portion of the silicon nitride layer to expose a surface of the silicon structure; and
    performing a temperature-sensitive operation with the surface of the silicon structure.

14. The method of claim 13, comprising annealing the silicon nitride layer prior to burying the silicon nitride layer in the second dielectric layer.

15. The method of claim 13, wherein the silicon waveguide and the silicon nitride waveguide define an optical transition and are separated by an interlayer gap.

16. The method of claim 13, wherein the temperature-sensitive operation comprises disposing a metal contact over at least a portion of the surface of the silicon structure.

17. A method of manufacturing a photonic circuit, the method comprising:
    forming a first semiconductor layer using a first high temperature process;
    burying the first semiconductor layer in a first dielectric layer;
    forming a second semiconductor layer using a second high temperature process;
    burying the second semiconductor layer in a second dielectric layer having a thickness that exceeds the first dielectric layer;
    etching through a portion of the second dielectric layer over the first semiconductor layer, using the second semiconductor layer as an etch stop, exposing a surface of the first dielectric layer;
    etching through the surface of the first dielectric layer to expose a portion of the first semiconductor layer;
    implanting and activating an implant within the portion of the first semiconductor layer in a low temperature process; and
    conductively coupling the implant to a circuit.

18. The method of claim 17, wherein the first semiconductor layer defines an optical waveguide.

19. The method of claim 17, wherein the second semiconductor layer defines an optical waveguide.

20. The method of claim 17, wherein at least one of the first high temperature process or the second high temperature process comprising annealing a layer of the photonic circuit.

* * * * *